United States Patent
Takegama et al.

(10) Patent No.: US 7,680,874 B2
(45) Date of Patent: Mar. 16, 2010

(54) ADDER

(75) Inventors: Akihiro Takegama, Ibaraki (JP); Tsuyoshi Tanaka, Nagasaki (JP); Masahiro Fusumada, Tokyo (JP)

(73) Assignee: Texas Instruments Incorporated, Dallas, TX (US)

( * ) Notice: Subject to any disclaimer, the term of this patent is extended or adjusted under 35 U.S.C. 154(b) by 1075 days.

(21) Appl. No.: 11/038,563

(22) Filed: Jan. 18, 2005

(65) Prior Publication Data

US 2005/0188000 A1   Aug. 25, 2005

(30) Foreign Application Priority Data

Jan. 19, 2004   (JP)   ............................. 2004-011018

(51) Int. Cl.
*G06F 7/50* (2006.01)
*G06F 7/38* (2006.01)
(52) U.S. Cl. ..................... 708/710; 708/518; 708/552
(58) Field of Classification Search ................. 708/552, 708/518, 525, 700
See application file for complete search history.

(56) References Cited

U.S. PATENT DOCUMENTS

| 4,379,338 | A | * | 4/1983 | Nishitani et al. ............. 708/552 |
| 5,483,478 | A | * | 1/1996 | Chiang ........................ 708/710 |
| 5,991,868 | A | * | 11/1999 | Kamiyama et al. ............ 712/32 |
| 6,408,320 | B1 | * | 6/2002 | Shiell ......................... 708/518 |
| 6,912,560 | B2 | * | 6/2005 | Goldovsky ................... 708/525 |

* cited by examiner

*Primary Examiner*—Chuong D Ngo
(74) *Attorney, Agent, or Firm*—Robert D. Marshall, Jr.; Wade J. Brady, III; Frederick J. Telecky, Jr.

(57) ABSTRACT

An adder that can detect the generation of overflow at a high speed. Carry signal c14 from the 15$^{th}$ digit to the 16$^{th}$ digit in the result of addition from the 1$^{st}$ digit to the 16$^{th}$ digit of the input data is generated on the basis of bit signals (a0-a15, b0-b15) for the portion from the 1$^{st}$ digit to the 15$^{th}$ digit of the input data, and of carry signal CIN input to the 1$^{st}$ digit, and it is output from CLA 204. Then, carry signal c15 from the 16$^{th}$ digit to the 17$^{th}$ digit is generated based on said generated carry signal c14 and bit signals (a15, b15) of the 16$^{th}$ digit of the input data, and this is output from CIA 205. Exclusive-NOR circuit 206 then operates on said carry signals c14 and c15, and overflow detection signal OVF16 is generated.

3 Claims, 7 Drawing Sheets

ADDER

FIELD OF THE INVENTION

The present invention pertains to a type of adder. In particular, the present invention pertains to a type of adder having an overflow detecting function for use in arithmetic logic operation devices, etc.

BACKGROUND OF THE INVENTION

Usually, DSP (digital signal processors) and other processors have an arithmetic logic operation device (arithmetic logic unit: ALU) for performing arithmetic operations (addition, multiplication, etc.) and logic operations (bit inversion, bit shift, etc.). The various types of arithmetic operations performed by an ALU are based on the addition operation, and they make use of the addition operation results. Usually, the ALU adder has a function for detecting whether overflow occurs in the addition result. When overflow is detected, the ALU performs processing to forcibly correct the output to a prescribed value (such as positive maximum value or a negative minimum value).

Japanese Kokai Patent Application No. Hei 7-182141 describes a technology pertaining to an operation device that performs said overflow correction. The prior art of adders having an overflow detecting function will be explained in the following.

For the adder to be explained below, 40-bit signals [a0, ... a39] and [b0, ... b39] as well as carry signal CIN to the least significant digit (first digit) are input, and a 40-bit signal [s0, ... s39] is output as the addition result. Also, said adder has two operating modes, that is, a 40-bit mode and a 32-bit mode. In addition, it has a conventional mode and a dual mode in each of said operating modes. In the 40-bit mode, the adder performs addition operations with the $40^{th}$ digit as the most significant digit. Also, it outputs overflow detection signal OVF as the signal indicating the presence/absence of overflow in the addition operation, with the $40^{th}$ digit taken as the sign digit. On the other hand, in the 32-bit mode, the addition operation is performed with the $32^{nd}$ digit as the most significant digit. In this case, said overflow detection signal OVF is output as the signal indicating the presence/absence of overflow in the addition operation with the $32^{nd}$ digit taken as the sign digit.

In the conventional mode, the adder performs only the addition operation from the first digit to the most significant digit (that is, the $40^{th}$ digit in the 40-bit mode, or the $32^{nd}$ digit in the 32-bit mode). In the dual mode, the addition operation from the first digit to the $16^{th}$ digit and the addition operation from the $17^{th}$ digit to the most significant digit are performed in parallel. In the dual mode of the adder, carry signal CIN for the addition operation of the less significant side ($1^{st}$-$16^{th}$ digits) is input as the carry to the least significant digit, and carry signal Cdual is input for the addition operation of the more significant side ($17^{th}$ to most significant digits). Also, overflow detection signal OVF16 is output as the signal indicating the presence/absence of overflow in the addition operation of the less significant side, with the $16^{th}$ digit taken as the sign digit.

FIG. 12 is a block diagram illustrating an example of the constitution of the circuit for generating overflow detection signal OVF16 of the less significant 16 digits in the dual mode in said adder. The circuit shown in FIG. 12 has the following circuits: carry generating signal output circuits 1, ... 4, 11, 12, carry propagation signal output circuits 5, ... 10, selectors 13 and 14, carry select adder (hereinafter to be referred to as CSA) 15 and exclusive-NOR circuit 16.

Overflow detection signal OVF16 is a signal that is "0" when overflow occurs and is "1" when overflow does not occur in the addition result for input data in the two's complement form, with the $16^{th}$ digit taken as the sign digit in the dual mode, and it is represented by the following operation:

[Mathematical Equation 1]

$$OVF16 = \overline{c14 \oplus c15} \tag{1}$$

Here, carry signal ci (where i represents an integer in the range of 0-39) indicates the carry from the $(i+1)^{th}$ digit to the $(i+2)^{th}$ digit. In the circuit shown in FIG. 12, when said overflow detection signal OVF16 is computed, carry signals c11 and c15 are first computed using the carry look-ahead system. In the circuit shown in FIG. 12, the portion composed of carry generating signal output circuits (1-4, 11, 12), carry propagation signal output circuits (5-10) and selectors (13, 14) is the carry look-ahead circuit that generates carry signals C11 and C15. This carry look-ahead circuit generates the intermediate carry generating signal and the carry propagation signal in two separate steps, and finally obtains carry signals (C11, C15).

Carry signals C11 and C15 are represented by the following equations, respectively:

[Mathematical equation 2]

$$\begin{aligned}
c11 = {} & p11 \times p10 \ldots \times p0 \times CIN + \\
& p11 \times p10 \times \ldots \times p1 \times g0 + \\
& p11 \times p10 \times \ldots \times p2 \times g1 \\
& \vdots + \\
& p11 \times g10 + \\
& g11
\end{aligned} \tag{2}$$

$$\begin{aligned}
c15 = {} & p15 \times p14 \ldots \times p0 \times CIN + \\
& p15 \times p14 \times \ldots \times p1 \times g0 + \\
& p15 \times p14 \times \ldots \times p2 \times g1 \\
& \vdots + \\
& p15 \times g14 + \\
& g15
\end{aligned} \tag{3}$$

Here, symbols pi and gi represent the carry propagation signal and carry generating signal of the $(i+1)^{th}$ digit, respectively, and they are represented by the following equations:

[Mathematical Equation 3]

$$p_i = a_i \oplus b_i \tag{4}$$

$$g_i = a_i \times b_i \tag{5}$$

Carry generating signal output circuits 1, 2, 3, 4 generate carry generating signals G3_0, G7_4, G11_8, G15_12, respectively.

With regard to carry generating signal G(j+3)_j (where j represents one of the integers 0, 4, 8 or 12), when 4-bit input data [aj, ... a(j+3)] and [bj, ... b(j+3)] are added, it is a signal indicating whether carry signal c(j+3) to the more significant digit becomes "1," independent of carry signal C(j−1) (or CIN when j=0) from the less significant digit with respect to said 4 bits. When said signal is "1," carry signal c(j+3) becomes "1" independent of the carry from the less significant digit. Carry generating signal G(j+3)_j is represented by the following equation:

[Mathematical Equation 4]

$$G(j+3)\_j = p(j+3) \times p(j+2) \times p(j+1) \times gj + \\ p(j+3) \times p(j-2) \times g(j+1) + p(j+3) \times g(j+2) + g(j+3) \quad (6)$$

Carry propagation signal output circuits 5, 6, 7, 8 generate carry propagation signals P3_0, P7_4, P11_8, and P15_12, respectively. With regard to carry propagation signal P(j+3)_j (where j is one of the integers 0, 4, 8, or 12), when 4-bit input data [aj, . . . a(j+3)] and [bj, . . . b(j+3)] are added, it is a signal indicating whether carry signal c(j+3) to the more significant digit changes, depending on carry signal C(j−1) (or CIN when j=0) from the less significant digit with respect to said 4 bits. When said signal is "1," carry signal c(j+3) changes to "1" or "0," depending on the carry from the less significant digit.

Carry propagation signal P(j+3)_j is represented by the following equation:

[Mathematical Equation 5]

$$P(j+3)\_j = p(j+3) \times p(j+2) \times p(j+1) \times pj \quad (7)$$

Carry propagation signal output circuits 9, 10 generate carry propagation signals P11_0 and P15_0, respectively. Carry propagation signals P11_0 and P15_0 are represented by the following equations, respectively:

[Mathematical Equation 6]

$$P11\_0 = P11\_8 \times P7\_4 \times P3\_0 \quad (8)$$
$$= p11 \times p10 \times \ldots \times p0$$

$$P15\_0 = P15\_12 \times P11\_8 \times P7\_4 \times P3\_0 \quad (9)$$
$$= p15 \times p14 \times \ldots \times p0$$

Carry generating signal output circuits 11, 12 generate carry generating signals G11_0 and G15_0, respectively. Carry generating signals G11_0 and G15_0 are represented by the following equations, respectively:

[Mathematical equation 7]

$$G11\_0 = P11\_8 \times P7\_4 \times G3\_0 + \\ P11\_8 \times G7\_4 + \\ G11\_8 \\ = p11 \times \ldots \times p1 \times g0 + \\ p11 \times \ldots \times p2 \times g1 \\ \vdots \\ + \\ p11 \times g10 + \\ g11 \quad (10)$$

$$G15\_0 = P15\_12 \times P11\_8 \times P7\_4 \times G3\_0 + \\ P15\_12 \times P11\_8 \times G7\_4 + \quad (11)$$

-continued
$$P15\_12 \times G11\_8 + \\ G15\_12 \\ = p15 \times \ldots \times p1 \times g0 + \\ p15 \times \ldots \times p2 \times g1 \\ \vdots \\ + \\ p15 \times g14 + \\ g15$$

Here, by substituting equations 8 and 10 into equation 2, one obtains carry signal c11 represented by the following equation:

[Mathematical Equation 8]

$$c11 = P11\_0 \times CIN + G11\_0 \quad (12)$$

Also, by substituting equations 9 and 11 into equation 3, one obtains carry signal C15 represented by the following equation:

[Mathematical Equation 9]

$$c15 = P15\_0 \times CIN + G15\_0 \quad (3)$$

Selector 13 selects and outputs carry generating signal G11_0 when carry propagation signal P11_0 is "0," and it selects and outputs carry signal CIN when carry propagation signal P11_0 is "1." When carry propagation signal P11_0 becomes "1," all the carry generating signals g0-g11 become "0," and carry generating signal G11_0 becomes "0." Consequently, the output signal of selector 13 becomes equal to carry signal c11 shown in equation 12.

Selector 14 selects and outputs carry generating signal G15_0 when carry propagation signal P15_0 is "0," and it selects and outputs carry signal CIN when carry propagation signal P15_0 is "1." Just as was explained above, when carry propagation signal P15_0 becomes "1," carry generating signal G15_0 becomes "0," and the output signal of selector 14 becomes equal to carry signal c15 shown in equation 13.

CSA15 computes beforehand the addition value for each of the $13^{th}$-$16^{th}$ digits when carry signal c11 is "1" and "0," and from the two sets of computed addition values, the addition values selected corresponding to the value of carry signal c11 are output as addition results s12-s15. Also, just as in the case of the $15^{th}$ carry, CSA15 selects one of the two pre-computed values corresponding to the value of carry signal c11, and outputs it as carry signal c14.

Exclusive-NOR circuit 16 computes the exclusive-NOR of carry signal c14 output from CSA15 and carry signal c15 output from selector 14. From the relationship of equation 1, the result of the operation of exclusive-NOR circuit 16 becomes overflow detection signal OVF16.

FIG. 13 is a block diagram illustrating an example of a circuit constitution for the output of carry signal C15A to the $17^{th}$ digit. The same reference numbers are adopted as those in FIG. 12. Selector 17 selects and outputs carry signal Cdual input from the outside when dual mode assigning signal Mdual is "1," and when Mdual is "0," it selects and outputs carry signal c15 of the less significant 16 digits generated in the circuit shown in FIG. 12. The output signal of selector 17 becomes carry signal C15A to the $17^{th}$ digit.

FIG. 14 is a block diagram illustrating an example of a circuit constitution for generating overflow detection signal OVF. The circuit shown in FIG. 14 has CSA 18, AND circuit 19, NOR circuit 20, OR circuit 21 and selectors 22 and 23. The circuit shown in FIG. 14 computes overflow detection signal OVF40 of the 40-bit mode and overflow detection signal OVF32 of the 32-bit mode, respectively.

Overflow detection signal OVF40 is a signal that is "0" when overflow occurs in the addition result for input data in the two's complement form, with the $40^{th}$ digit being taken as the sign digit, and it is "1" when overflow does not occur. It is represented by the following equation:

[Mathematical Equation 10]

$$OVF40 = \overline{c38} \ominus c39 \qquad (14)$$

Also, overflow detection signal OVF32 is a signal that is "0" when overflow occurs in the addition result for input data in the two's complement form with the $32^{nd}$ digit being taken as the sign digit, and it is "1" when overflow does not occur. It is represented by the following equation:

[Mathematical Equation 11]

$$OVF32 = (s31 \times \ldots \times s39) + \overline{(s31 + \ldots + s39)} \qquad (15)$$

As can be seen from equation 15, in the 32-bit mode, overflow occurs when addition results s31-s39 are neither all "1" nor all "0." For the situations when carry signal c30 is "1" and "0," CSA18 computes beforehand the addition values of the various digits from the $32^{nd}$-$40^{th}$ digits, and from the two sets of the addition values computed, the addition values selected corresponding to carry signal c30 are output as addition results s31-s39. Together with said addition values, the pre-computed carries of the $39^{th}$ digit and $40^{th}$ digit are used, and when carry signal c30 is "0" and "1," signals SC0 and SC1 for predicting whether overflow of the 40-bit mode occurs are respectively computed.

When carry signal c30 is "0," the computed carry values of the $39^{th}$ digit and $40^{th}$ digit are taken as carry signals c38_0 and c39_0, respectively, and when carry signal c30 is "1," the computed carry values of the $39^{th}$ digit and $40^{th}$ digit are taken as c38_1 and c39_1, respectively. The overflow prediction signals SC0 and SC1 are respectively represented by the following equations:

[Mathematical Equation 12]

$$SC0 = \overline{c38\_0} \ominus c39\_0 \qquad (16)$$

$$SC1 = \overline{c38\_1} \oplus c39\_1 \qquad (17)$$

Selector 22 takes overflow prediction signals SC0 and SC1 computed by CSA 18 as inputs, outputting prediction signal SC0 when carry signal c30 is "0," and prediction signal SC1 when carry signal c30 is "1." The output signal is input to selector 23 as overflow detection signal OVF40. AND circuit 19 computes the AND of addition results s31-s39 computed by CSA 18. The result has a value equal to the first term on the right hand side of equation 15. NOR circuit 20 computes the NOR of addition results s31-s39 computed by CSA 18. This result has a value equal to the second term on the right-hand side of equation 15. OR circuit 21 computes the OR of the output signals of AND circuit 19 and NOR circuit 20. The result is input to selector 23 as overflow detection signal OVF32. Selector 23 selects one of the two input overflow detection signals OVF32 and OVF40 corresponding to mode assigning signal M40, and outputs it as overflow detection signal OVF.

In the circuit shown in FIG. 12, in order to increase the speed of generating carry signal c15 and overflow detection signal OVF16, the processes for generating the two carry signals c14 and c15 are performed in parallel. That is, carry look-ahead circuits (9, 11) for generating carry signal c14 and carry look-ahead circuits (10, 12) for generating carry signal c15 are independent from each other. Consequently, the capacitive load rises for the former-stage carry look-ahead circuits (1-8) for driving said circuits, the power consumption increases, and the speed of overflow detection signal OVF16 decreases. This is undesirable.

In the circuit shown in FIG. 13, carry generating signal G15_0 that is required to have the highest speed among the signals that generate carry signal c15A has to pass through the two stages of selectors (14, 17) before reaching the output. Consequently, the generation of carry signal c15A becomes slower, and the operating speed drops. This is undesirable.

In addition, in the circuit shown in FIG. 14, after the arrival of carry signal c30 as the most delayed signal, the addition results s31-s39, output signal 0 of AND circuit 19 and NOR circuit 20, the overflow detection signal OVF32 and overflow detection signal OVF are established sequentially. In other words, because the path of carry signal c30 that requires a high speed is long, the speed of overflow detection signal OVF decreases, and this is undesirable.

A general object of the present invention is to solve the problems of the prior art by providing a type of adder that can detect the generation of overflow at high speed.

SUMMARY OF THE INVENTION

This and other objects and features are provided, in accordance with one aspect of the invention by an adder characterized by the fact that the adder that adds the input first data and second data has the following circuits: a first carry signal generator that generates the $(m-1)^{th}$ carry signal from the $(m-1)^{th}$ digit to the $m^{th}$ digit in the result of addition from a prescribed less significant digit to the $m_{th}$ digit (where m is a natural number of 2 or larger) of said first data and said second data on the basis of the bit signal of the portion from said prescribed less significant digit to said $(m-1)^{th}$ digit of said first data and said second data and the carry signal input to said prescribed less significant digit; a second carry signal generator that generates the $m^{th}$ carry signal from said $m^{th}$ digit to said $(m+1)^{th}$ digit on the basis of said generated $(m-1)^{th}$ carry signal and the bit signal of said $m^{th}$ digit of said first data and said second data; and a logic operation circuit that performs a prescribed logic operation for said generated $(m-1)^{th}$ carry signal and said $m^{th}$ carry signal, and outputs the result of addition from said prescribed less significant digit to the $m^{th}$ digit, with said $m^{th}$ digit serving as the sign digit, as the signal indicating whether overflow occurs.

Another aspect of the invention is characterized in that it may have the following circuits: a first selection circuit, which selects the carry signal input to said $(m+1)^{th}$ digit in the first operation mode in which addition is performed from said $(m+1)^{th}$ digit to a prescribed digit more significant than said $(m+1)^{th}$ digit, and which selects the $m^{th}$ carry generating signal corresponding to the $m^{th}$ digit bit signals of said first data and said second data in the second operation mode in which addition is performed from said prescribed less significant digit to said prescribed digit more significant than said $(m+1)^{th}$ digit; and a second selection circuit, which selects the signal selected by said first selection circuit in said first operation mode, and which selects either said generated $(m-1)^{th}$ carry signal or the signal selected by said first selection circuit on the basis of the $m^{th}$ carry propagation signal corresponding to the exclusive-OR of the $m^{th}$ digit bit signals of said first data and said second data, and as a result of said selection outputs the signal as the carry signal for said $(m+1)^{th}$ digit in said second operation mode.

A third aspect of the invention provides a type of adder characterized by the fact that the adder that adds the input first data and second data has the following circuits: a first bit value judgment circuit that performs the following operation: in the result of addition from a prescribed less significant digit to the $q^{th}$ digit (where q is a natural number of 2 or larger) in said first data and said second data, assuming the bit signal of the $p^{th}$ digit (where p is a natural number in the range of 1-q) has the first value, it judges whether all of the bit signals from the $(p+1)^{th}$ digit to said $q^{th}$ digit become said first value; a second bit value judgment circuit that performs the following operation: in the case when said $p^{th}$ digit bit signal in said addition result is assumed to have a second value, judgment is made as to whether all of the bit signals from said $(p+1)^{th}$ digit to said $q^{th}$ digit in said addition result become said second value; a first selection circuit that selects either the judgment signal of said first bit value judgment circuit or the judgment signal of said second bit value judgment circuit on the basis of the $p^{th}$ carry propagation signal corresponding to the exclusive-OR of said $p^{th}$ digit bit signals of said first data and said second data; a second selection circuit that selects the other judgment signal, not selected by said first selection circuit, from among the judgment signal of said first bit value judgment circuit and the judgment signal of said second bit value judgment circuit on the basis of said $p^{th}$ carry propagation signal; and a third selection circuit, which selects the judgment signal selected in said first selection circuit or said second selection circuit on the basis of the $(p-1)^{th}$ carry signal from said $(p-1)^{th}$ digit to said $p^{th}$ digit in said addition result, and which outputs said selected judgment signal as the signal indicating whether overflow is generated in the result of addition from said prescribed less significant digit to said $p^{th}$ digit, with said $p^{th}$ digit serving as the sign digit.

A fourth aspect of the invention provides a type of adder characterized by the having the following circuits: a first addition result predicting circuit that performs the following operation: in the result of addition from a prescribed less significant digit to the $q^{th}$ digit (where q is a natural number of 2 or larger) of said first data and said second data, assuming the (p−1) carry signal from said $(p-1)^{th}$ digit to said $p^{th}$ digit has the first value, the result of addition of each of the digits from said $p^{th}$ digit to said $q^{th}$ digit is predicted; a second addition result predicting circuit that predicts the addition result of each of the digits from said $p^{th}$ digit to said $q^{th}$ digit when it is assumed that said $(p-1)^{th}$ carry signal has the second value; a first judgment circuit that judges whether all of the addition results from the $(p+1)^{th}$ digit to the $q^{th}$ digit predicted by said first addition result predicting circuit are said first value; a second judgment circuit that judges whether all of the addition results from the $(p+1)^{th}$ digit to the $q^{th}$ digit predicted by said first addition result predicting circuit are said second value; a third judgment circuit that judges whether all of the addition results from the $(p+1)^{th}$ digit to the $q^{th}$ digit predicted by said second addition result predicting circuit are said first value; a fourth judgment circuit that judges whether all of the addition results from the $(p+1)^{th}$ digit to the $q^{th}$ digit predicted by said second addition result predicting circuit are said second value; a first selection circuit that selects either the judgment signal of said first judgment circuit or the judgment signal of said second judgment circuit on the basis of the $p^{th}$ carry propagation signal corresponding to the exclusive-OR of said $p^{th}$ digit bit signals of said first data and said second data; a second selection circuit that selects either the judgment signal of said third judgment circuit or the judgment signal of said fourth judgment circuit on the basis of said $p^{th}$ carry propagation signal; and a third selection circuit that selects the judgment signal selected by either said first selection circuit or said second selection circuit on the basis of said $(p-1)^{th}$ carry signal, and outputs the selected judgment signal as the signal indicating whether overflow occurs in the result of addition from said prescribed less significant digit to said $p^{th}$ digit, with said $p^{th}$ digit taken as the sign digit.

Another aspect of the invention may have the following features: it has the following circuits: an overflow predicting circuit that predicts whether overflow occurs in the result of addition from said prescribed less significant digit to said $q^{th}$ digits with said $q^{th}$ digit taken as the sign digit, in the first case when said $(p-1)^{th}$ carry signal has the first value and in the second case when said $(p-1)^{th}$ carry signal has the second value, respectively; a fourth selection circuit that selects the judgment signal selected by said first selection circuit or the prediction signal in said first case by said overflow predicting circuit on the basis of the operation mode assigning signal that assigns the operation mode which obtains the addition result with said $p^{th}$ digit serving as the sign digit, or the operation mode which obtains the addition result with said $q^{th}$ digit serving as the sign digit; and a fifth selection circuit that selects the judgment signal selected by said second selection circuit or the prediction signal in said second case by said overflow predicting circuit on the basis of said operation mode assigning signal; said third selection circuit selects the signal selected by said fourth selection circuit or said fifth selection circuit on the basis of said $(p-1)^{th}$ carry signal, and outputs the selected signal as the signal indicating whether overflow occurs in the addition result from said prescribed less significant digit to said $p^{th}$ digit, with said $p^{th}$ digit taken as the sign digit, or as the signal indicating whether overflow occurs in the addition result from said prescribed less significant digit to said $q^{th}$ digit, with said $q^{th}$ digit taken as the sign digit.

Figure 1:
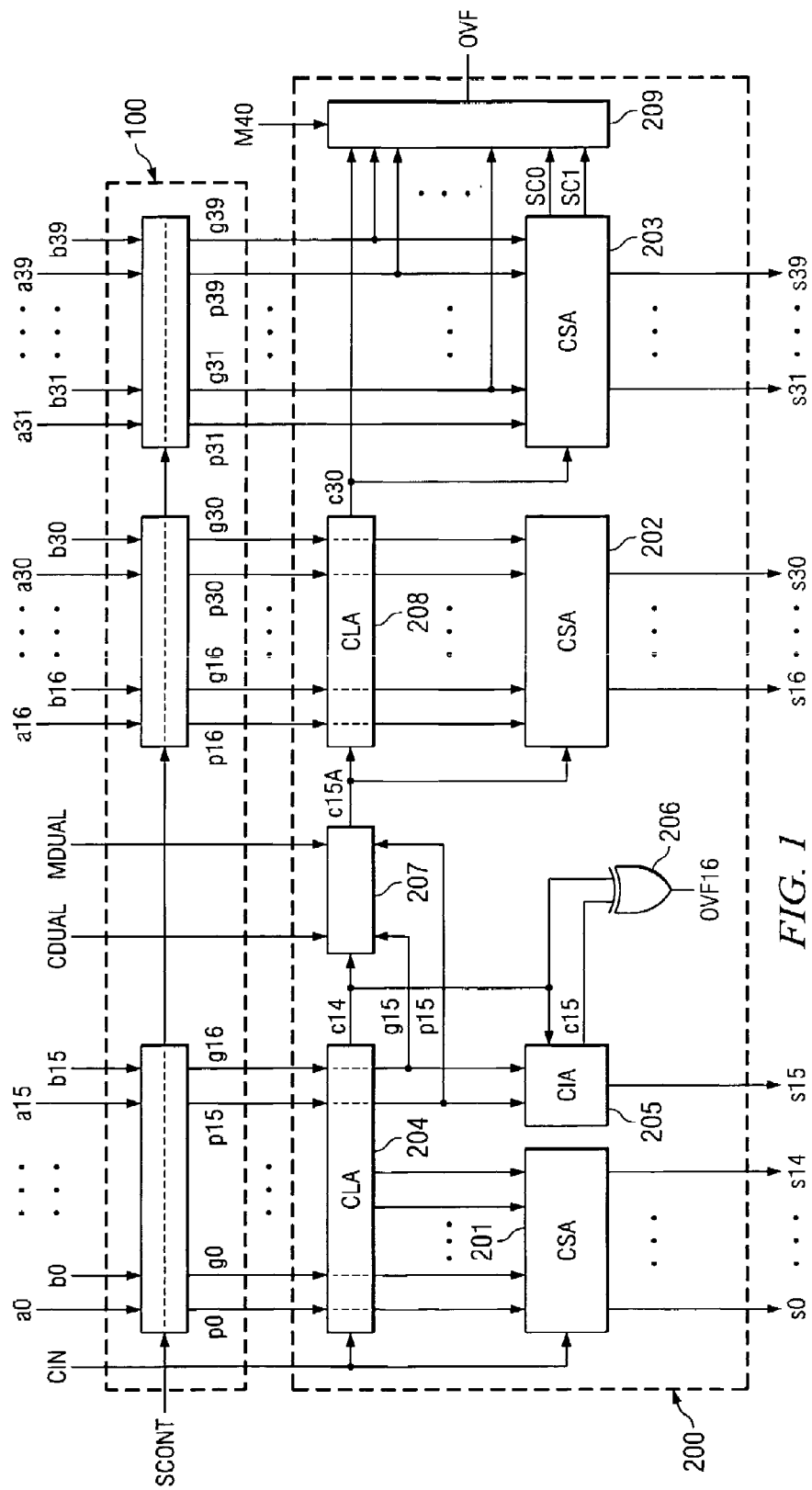
FIG. 1 is a block diagram illustrating an example of the constitution of the adder in Embodiment 1 of the present invention.

REFERENCE NUMERALS AND SYMBOLS AS SHOWN IN THE DRAWINGS 100 is a logic operation part, 200 is an adder part, 201, 202, 205 are carry increment adders (CIA), 203 is a carry select adder (CSA), 204, 208 are carry look-ahead circuits (CLA), 206, 290_9-290_16, 291_1-291_8 are exclusive-NOR circuits, 207, 240, 247 are carry signal output circuits, 209, 209A are overflow detection signal output circuits, 230_31-230_39[sic; 230_39], 231_31-231_39 are full adders, 241-243 are carry generating signal output circuits, 244-246 are carry propagation signal output circuits, 270 is a NOT circuit, 271, 291_9 are AND circuits, 290_1-290_8 are OR circuits, 290_17 is a NOR circuit, 272, 273, 292-296 are selectors, 290 is a first bit value judging circuit, 291 is a second bit value judging circuit, 297_0 is a first judgment circuit, 298_0 is a second judgment circuit, 297_1 is a third judgment circuit, and 298_1 is a fourth judgment circuit.

DESCRIPTION OF THE EMBODIMENTS

According to an aspect of the present invention, generation of overflow can be detected at high speed. This is an advantage. In the following, the present invention will be explained in more detail with reference to two embodiments applied to an ALU adder illustrated with FIGS.

Embodiment 1

FIG. 1 is a block diagram illustrating an example of the constitution of the adder in Embodiment 1 of the present invention.

Just as in said prior art, the adder to be explained below has 40-bit signals [a0, ... a39] and [b0, ... b39] as well as carry signal CIN to the 1$^{st}$ digit input to it, and it outputs 40-bit signal [s0, ... s39] as the addition result. Also, it has two operating modes (that is, the 40-bit mode and 32-bit mode). In addition, it has the conventional mode and dual mode in each of these operation modes.

In the 40-bit mode, the adder performs the addition operation with the 40$^{th}$ digit taken as the most significant digit. Also, it outputs overflow detection signal OVF as the signal indicating the presence/absence of overflow in the addition operation. On the other hand, in the 32-bit mode, the addition operation is performed with the 32$^{nd}$ digit taken as the most significant digit. In this case, said overflow detection signal OVF is output as the signal indicating the presence/absence of overflow in the addition operation with the 32$^{nd}$ digit taken as the sign digit.

In the conventional mode, the adder only performs the addition operation from the first digit to the most significant digit (that is, the 40$^{th}$ digit or the 32$^{nd}$ digit). In the dual mode, the addition operation from the first digit to the 16$^{th}$ digit and the addition operation from the 17$^{th}$ digit to the most significant digit are performed in parallel. In this case, carry signal CIN for the addition operation of the less significant side is input as the carry to the least significant digit, and carry signal Cdual is input for the addition operation of the more significant side. Also, overflow detection signal OVF16 is output as the signal indicating the presence/absence of overflow in the addition operation of the less significant side, with the 16$^{th}$ digit taken as the sign digit.

In the example shown in FIG. 1, this adder has logic operation part 100 and addition part 200. Addition part 200 has carry increment adders (hereinafter to be referred to as CIA) 201, 202, 205, carry save adder (CSA) 203, carry look-ahead circuits 204, 208, carry signal output circuit 207, exclusive-NOR circuit 206, and overflow detection signal output circuit 209. This constitution will be explained first.

Logic Operation Part 100

Logic operation part 100 has 40-bit signals [a0, ... a39] and [b0, ... b39] input to it, and it performs logic operations according to control signal Scont for the bit signals of the various digits of the input data.

Figure 2:
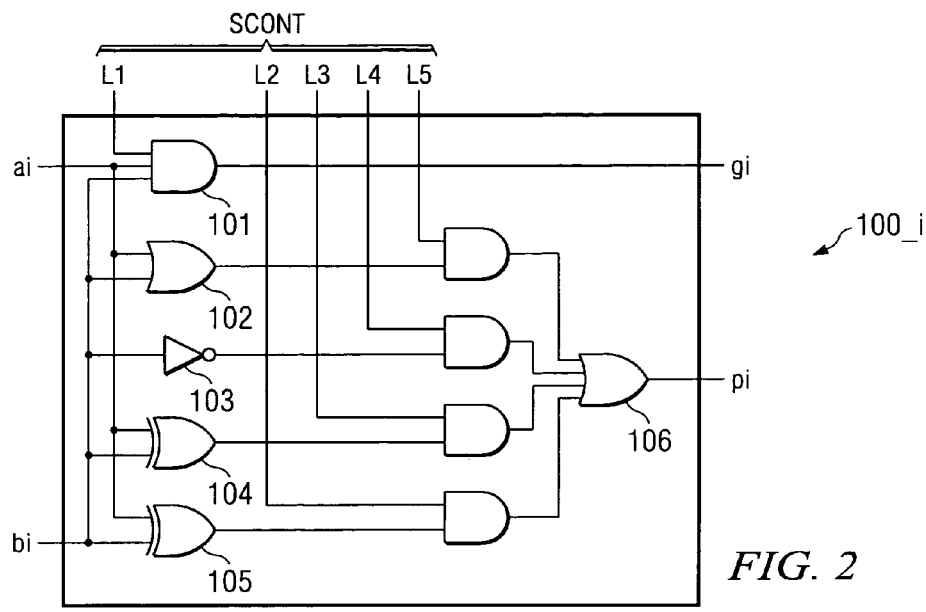
FIG. 2 is a block diagram illustrating an example of the constitution of the operation units for the various digits contained in logic operation part 100.

FIG. 2 is a block diagram illustrating an example of constitution of the (i+1)$^{th}$ digit operation unit (100_i) contained in logic operation circuit 100. This operation unit (100_i) is a circuit that performs the prescribed logic operation for input bit signals ai and bi according to control signal Scont containing signals L1-L5.

In the example shown in FIG. 2, operation unit (100_i) has the following circuits: AND circuit 101, OR circuit 102, NOT circuit 103, exclusive-NOR circuit 104, exclusive-OR circuit 105, and output circuit 106. Bit signals ai and bi and signal L1 contained in control signal Scont are input to AND circuit 101, and it outputs AND of said three inputs as signal gi. Bit signals ai and bi an input to each of OR circuit 102, exclusive-NOR circuit 104 and exclusive-OR circuit 105. For these two inputs, OR circuit 102 performs an OR operation; exclusive-NOR circuit 104 performs an exclusive-NOR operation; and exclusive-OR circuit 105 performs an exclusive-OR operation. NOT circuit 103 performs a NOT operation for input bit signal bi. Output circuit 106 selects from among the output signals of OR circuit 102, NOT circuit 103, exclusive-NOR circuit 104 and exclusive-OR circuit 105 according to signals L2-L5 contained in control signal Scont, and outputs their OR as signal pi. In this constitution, operation unit (100_i) can output AND of input bit signals ai and bi as signal gi.

Also, it is possible to output OR, exclusive-NOR, or exclusive-OR of input bit signals ai and bi, or NOT of input bit signal bi, as signal pi. In addition, it is also possible to perform the OR operation for a part or all of the logic operation results, with the result output as signal pi. Control signal Scont input to operation unit (100_i) is set appropriately so that when the addition operation is performed, signal pi becomes the carry propagation signal shown in equation 4 and signal gi becomes the carry generating signal shown in equation 5.

CIA 201

Carry propagation signals p0-p14 and carry generating signals g0-g14 of 1$^{st}$-15$^{th}$ digit output from logic operation part 100 and carry signal CIN to the 1$^{st}$ digit are input to CIA 201, and it outputs the corresponding addition results s0-s14.

CIA 201 has a circuit that sequentially propagates the local carry generating signals and carry propagation signals from the less significant digit to the more significant digit in conjunction with input of the 1$^{st}$-15$^{th}$ digit signals (p0-p14, g0-g14), and it computes addition results s1-s14 of the various digits corresponding to the local carry generating signals and carry propagation signals as well as carry signal CIN.

Figure 3:
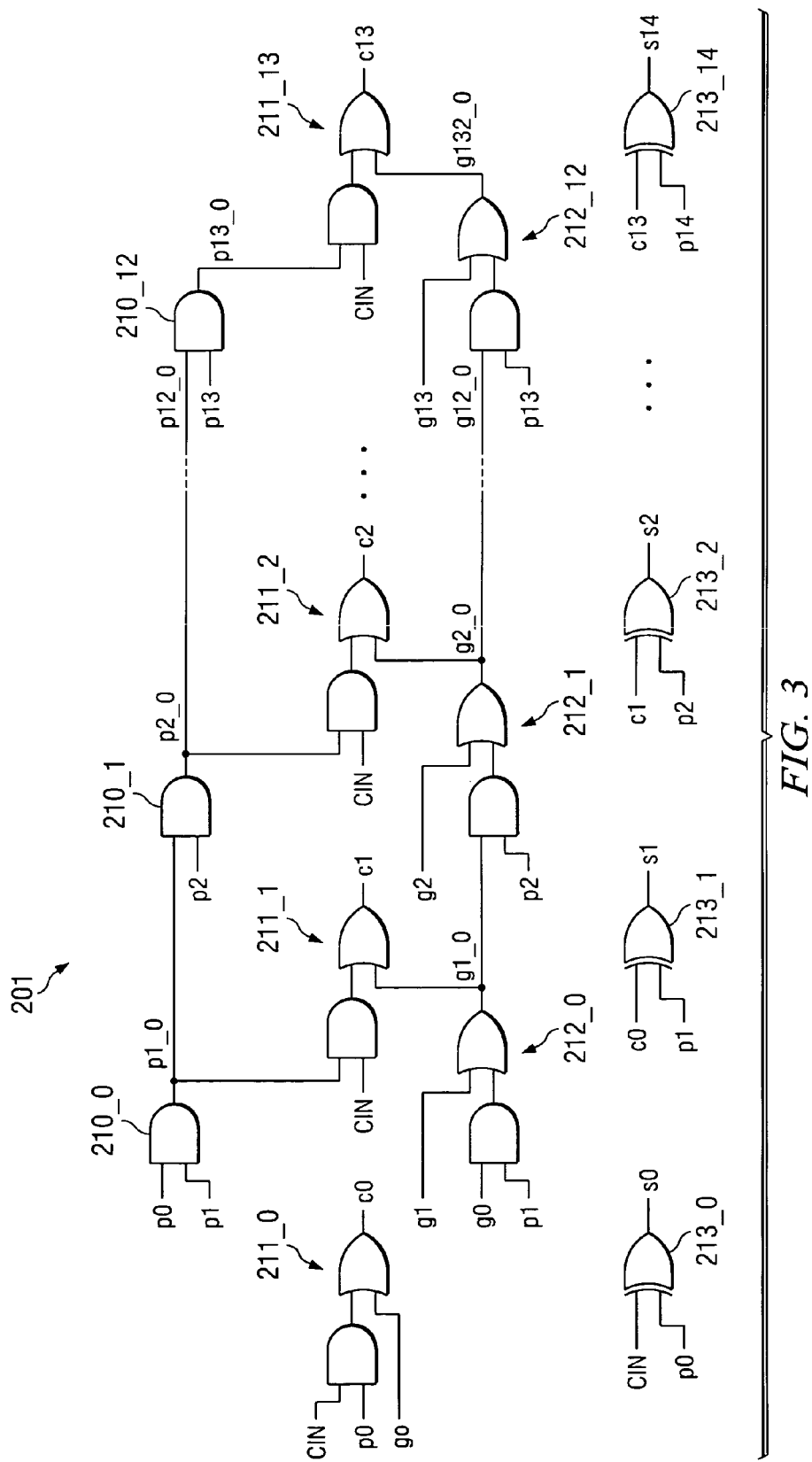
FIG. 3 is a block diagram illustrating an example of the constitution of the carry increment adder.

FIG. 3 is a block diagram illustrating an example of the constitution of CIA 201. CIA 201 shown in FIG. 3 has the following circuits: 2-input AND circuits (210_0), . . .

(210_12) that output local carry propagation signals p1_0, . . . p13_0, respectively, 3-input AND-OR composite circuits (212_0), . . . (212_12) that output local carry generating signals g1_0, . . . g13_0, respectively, 3-input AND-OR composite circuits (211_0), . . . (211_13) that output carry signals c0, . . . c13, respectively, and 2-input exclusive-OR circuits (213_0), . . . (213_14) that output addition results s0, . . . s14, respectively. Said 2-input AND circuits (210_0), . . . (210_12) are connected in tandem, and the output results of the local carry propagation signals are respectively input to the next stages. 2-input AND circuit (210_0) outputs the AND of carry propagation signals p0 and p1 as local carry propagation signal p1_0. 2-input AND circuit (210_k) (where k represents an integer in the range of 1-12) outputs the AND of local carry propagation signal pk_0, output from the preceding stage, and carry propagation signal p(k+1) as local carry propagation signal p(k+1)_0. Local carry propagation signals p1_0, . . . p13_0 are represented by the following equations:

[Mathematical equation 13]

$$p1\_0 = p1 \times p0 \quad (18)$$

$$p(k+1)\_0 = p(k+1) \times pk\_0 \quad (19)$$

$$= p(k+1) \times \ldots \times p1 \times p0$$

3-input AND-OR composite circuits (212_0), . . . (212_12) are connected in tandem, and the output results of the local carry generating signals are respectively input to the next stages. That is, 3-input AND-OR composite circuit (212_0) outputs OR of the signal of AND of carry generating signal g0 and carry propagation signal p1, and the signal of carry generating signal g1, as local carry generating signal g1_0. 3-input AND-OR composite circuit (212_k) (where k represents an integer in the range of 1-12) outputs OR of the signal of AND of local carry generating signal gk_0 output from the preceding stage and carry propagation signal p(k+1), and the signal of carry generating signal g(k+1), as local carry generating signal g(k+1)_0.

Local carry generating signals g1_0, . . . g13_0 are represented by the following equations:

[Mathematical equation 14]

$$g1\_0 = g0 \times p1 + g1 \quad (20)$$

$$g(k+1)\_0 = gk\_0 \times p(k+1) \times g(k+1) \quad (21)$$

$$= p(k+1) \times \ldots \times p1 \times g0 +$$

$$p(k+1) \times \ldots \times p2 \times g1$$

$$\vdots$$

$$p(k+1) \times gk +$$

$$g(k+1)$$

AND-OR composite circuit (211_0) outputs OR of the signal of AND of carry signal CIN and carry propagation signal p0, and the signal of carry generating signal g0, as carry signal c0 to the $2^{nd}$ digit. AND-OR composite circuit (211_k) (where k represents an integer in the range of 1-12) outputs OR of the signal of AND of carry signal CIN and local carry propagation signal pk_0, and the signal of local carry generating signal gk_0, as carry signal ck to the $(k+_1)^{th}$ digit.

Carry signal ck is represented by the following equation:

[Mathematical equation 15]

$$ck = pk\_0 \times CIN + gk\_0 \quad (22)$$

$$= pk \times \ldots \times p1 \times p0 \times CIN +$$

$$pk \times \ldots \times p1 \times g0 +$$

$$pk \times \ldots \times p2 \times g1$$

$$\vdots +$$

$$pk \times g(k-1) +$$

$$gk$$

Exclusive-OR circuit (213_0) outputs exclusive-OR of carry signal CIN and carry propagation signal p0 as addition result s0 of the $1^{st}$ digit. Exclusive-OR circuit (213_k) (where k represents an integer in the range of 1-12) outputs exclusive-OR of carry signal c(k−1) and carry propagation signal pk as addition result sk of the $(k+1)^{th}$ digit.

CIA 202

Carry propagation signals p16-p30 and carry generating signals g16-g30 of $17^{th}$-$31^{st}$ digits output from logic operation part 100 and carry signal c15A output from carry output circuit 207 to the $17^{th}$ digit are input to CIA 202, and it outputs the corresponding addition results s16-s30. CIA 202 has a circuit that sequentially propagates the local carry generating signals and carry propagation signals from the less significant digit to the more significant digit in conjunction with input of the $17^{th}$-$31^{st}$ digit signals (p16-p30, g16-g30), and it computes addition results s16-s30 of the various digits corresponding to the local carry generating signals and carry propagation signals, as well as carry signal c15A.

The circuit constitution of CIA 202 may be obtained by expanding the same constitution as that of CIA 201 shown in FIG. 3 to 16 bits. That is, when the same circuit as that shown in FIG. 3 is expanded to 16 bits, in the less significant 15-bit circuit the $17^{th}$-$30^{th}$ digit signals (p16-p29, g16-g29) and carry signal c15A are input instead of the $1^{st}$-$15^{th}$ digit signals (p0-p14, g0-g14) and carry signal CIN. In the expanded 16-bit circuit, the $31^{st}$ digit signals (p30, g30) and the signals from the less significant digits (local carry propagation signals, local carry generating signals, carry signals) are input. With such a circuit, it is possible to obtain carry signals c16-c30 and addition results s16-s31 of the $17^{th}$-$31^{st}$ digit.

CSA 203

CSA 203 computers beforehand the addition values of the various digits of the $32^{nd}$-$40^{th}$ digits when the carry signal c30 is "1" and "0," respectively, and it selects one the two sets of computed addition values according to the value of carry signal c30, and outputs addition results s31-s39. Together with these spectral values, the pre-computed carries of the $39^{th}$ digit and $40^{th}$ digit are used to compute overflow prediction signals SC0 and SC1 of the 40-bit mode when carry signal c30 is "0" and "1," respectively.

Figure 4:
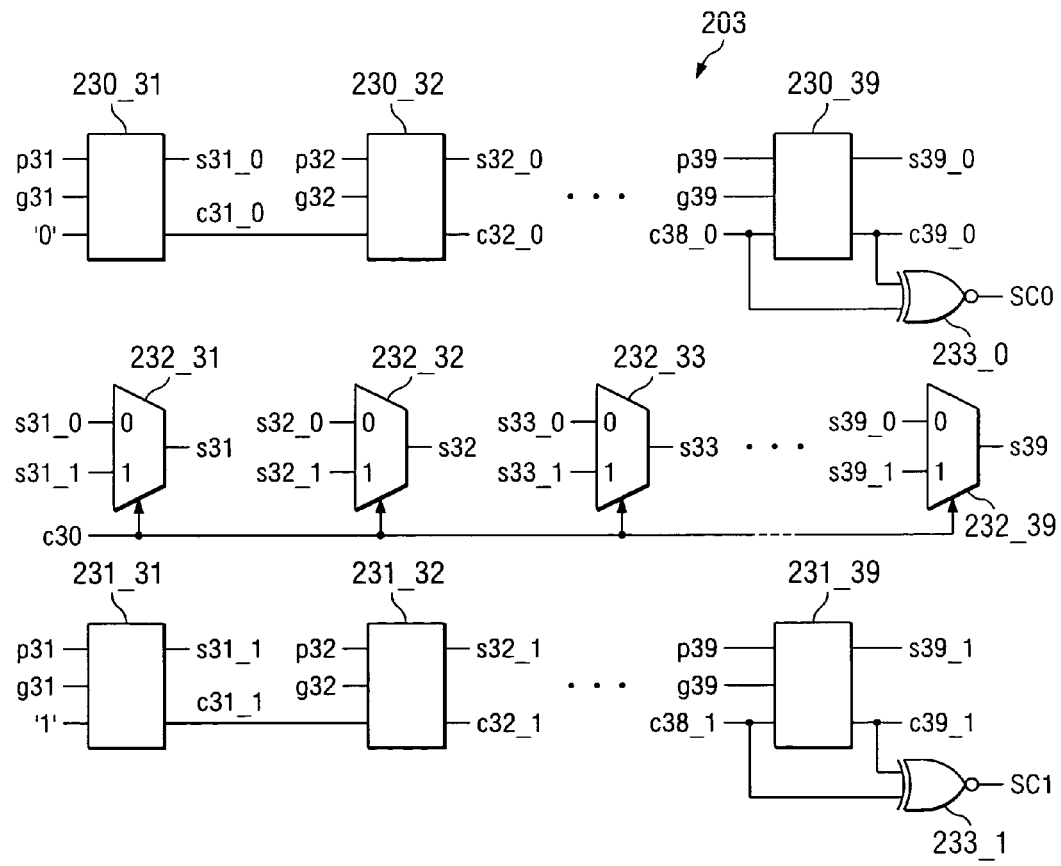
FIG. 4 is a block diagram illustrating an example of the constitution of the carry select adder.

FIG. 4 is a block diagram illustrating an example of the constitution of CSA 203. CSA 203 shown as an example in FIG. 4 has the following parts: full adders (230_31), . . . (230_39) that compute sum values s31_0, . . . s39_0 when carry signal c30 is "0," full adders (231_31), . . . (231_39) that compute sum values s31_1, ... s39_1 when carry signal c30 is "1," selectors (232_31), ... (232_39) that output addition results s31, ... s39, and exclusive-NOR circuits (233_0), (233_1) that output overflow prediction signals SC0, SC1.

Carry propagation signals and carry generating signals (p31 and g31, ... p39 and g39) of the portion from the $32^{nd}$-$40^{th}$ digit are input to full adders (230_31), ... (230_39), respectively. Also, full adders (230_31), ... (230_39) are connected in tandem. As the carry signal, signal "0" is input to the first-stage full adder (231_31), and the carry signals computed in the preceding stages are respectively input to the full adders of the successive stages. The carry propagation signals and carry generating signals (p31 and g31, ... p39 and g39) of the portion from the $32^{nd}$-$40^{th}$ digit are input to full adders (231_31), ... (231_39), respectively. Also, full adders (231_31), ... (231_39) are connected in tandem. As the carry signal, signal "1" is input to the first-stage full adder (230_31), and the carry signals computed in the preceding stages are input to the full adders of the successive stages, respectively.

Figure 5:
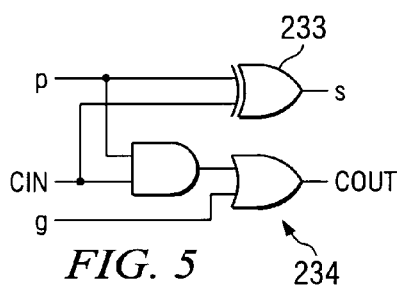
FIG. 5 is a block diagram illustrating an example of the constitution of the full adder contained in the carry select adder.

FIG. 5 is a block diagram illustrating an example of the constitution of said full adders (230_31-230_39, 231_31-231_39). The full adder shown as an example in FIG. 5 has exclusive-OR circuit 233 and AND-OR composite circuit 234. Symbols p, g, cin represent the carry propagation signals, carry generating signals and, carry signals input to the full adders, respectively, and symbols s, cout represent the sum values and carry signals output from the full adders. Exclusive-OR circuit 233 outputs exclusive-OR of carry signal cin and carry propagation signal p from the full adder of the preceding stage as sum value s. AND-OR composite circuit 234 outputs OR of the signal of AND of carry signal cin and carry propagation signal p, and the carry generating signal g, as carry signal cout to the full adder of the next stage. Selector (232_j) (where j represents an integer in the range of 31-39) has input to it addition result sj_0 of full adder 230_j with carry signal c30 assumed to be "0" and addition result sj_1 of full adder (231_j) with carry signal c30 assumed to be "1," and it selects one of these according to the value of carry signal c30 and outputs it as addition result sj.

CLA 204

CLA 204 generates carry signal c14 from the $15^{th}$ digit to the $16^{th}$ digit on the basis of carry propagation signals p0-p14, carry generating signals g0-g14 of the portion from the $1^{st}$ digit to the $15^{th}$ digit, and carry signal CIN input to the $1^{st}$ digit. The circuit containing said CLA 204 and operation units (100_0)-(100_14), an example of which is shown in FIG. 2, forms an embodiment of the first carry signal generator in the first invention.

Figure 6:
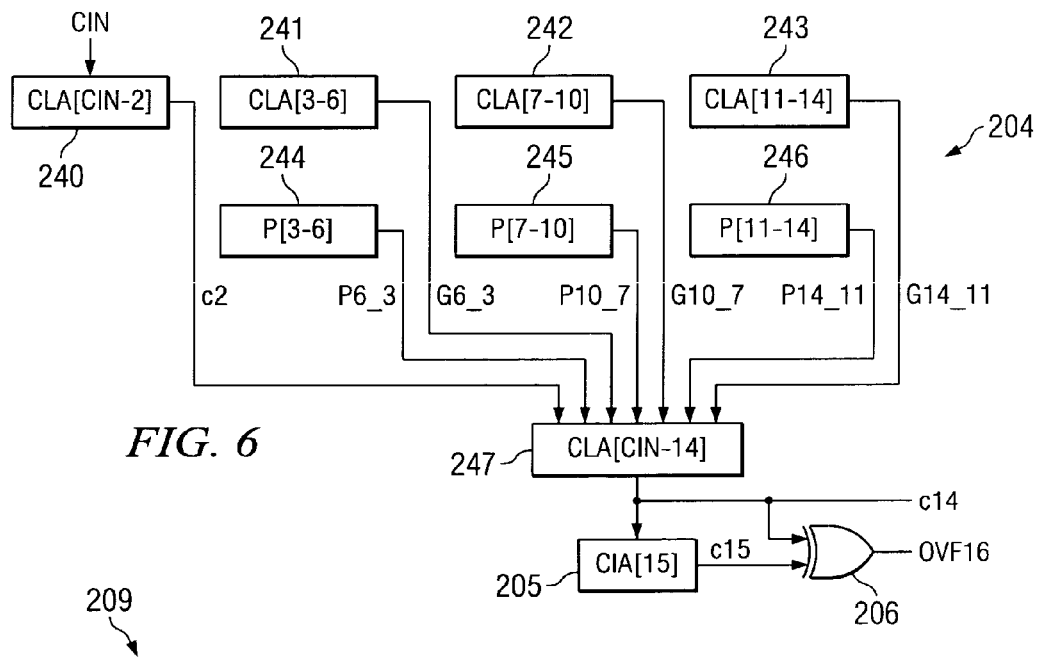
FIG. 6 is a block diagram illustrating an example of the constitution of the carry look-ahead circuit.

FIG. 6 is a block diagram illustrating an example of the constitution of CLA 204. It also shows the related parts, that is, CIA 205 and exclusive-NOR circuit 206. CLA 204 shown as an example in FIG. 6 has carry signal output circuits 240, 247, carry generating signal output circuits 241, ... 243, and carry propagation signal output circuits 244, ... 246.

Carry signal output circuit 240 generates carry signal c2 from the $3^{rd}$ digit to the $4^{th}$ digit, as represented by the following equation:

[Mathematical Equation 16]

$$c2 = p2 \times p1 \times p0 \times CIN + p2 \times p1 \times g0 + p2 \times g1 + g2 \quad (23)$$

Carry generating signal output circuits 241, 242, 243 generate carry generating signals G6_3, G11_7, G14_11, respectively. With regard to carry generating signal G(j+3)_j (where j represents integer of 3, 7 or 11), when 4-bit input data [a(j), ... a(j+3)] and [b(j), ... b(j+3)] are added, this signal indicates whether carry signal c(j+3) to the more significant digit becomes "1," independently of carry signal C(j−1) from the less significant digit with respect to said 4 bits. When said signal is "1," carry signal c(j+3) becomes "1" independently of the carry from the less significant digit. Carry generating signal G(j+3)_j is represented by equation 6. Carry generating signal output circuits 244, 245, 246 generate carry propagation signals P6_3, P10_7, P14_11, respectively. With regard to carry propagation signal p(j+3)_j (where j represents integer of 3, 7 or 11), when 4-bit input data [a(j), ... a(j+3)] and [b(j), ... b(j+3)] are added, this signal indicates whether carry signal c(j+3) to the more significant digit varies, depending on carry signal C(j−1) from the less significant digit with respect to said 4 bits. When said signal is "1," carry signal c(j+3) is changed to "1" or "0," depending on the carry from the less significant digit. Carry propagation signal P(j+3)_j is represented by equation 7. Carry signal output circuit 247 generates carry signal c14, represented by the following equation, on the basis of carry signal c2, carry generating signals G11_0, G15_0, and carry propagation signals P6_3, P10_7, P14_11:

[Mathematical equation 17]

$$\begin{aligned} c14 = &\, P14\_11 \times P10\_7 \times P6\_3 \times c2 + \\ &\, P14\_11 \times P10\_7 \times G6\_3 + \\ &\, P14\_11 \times G10\_7 + \\ &\, G14\_11 \\ = &\, p14 \times \ldots \times p0 \times CIN + \\ &\, p14 \times \ldots \times p1 \times g0 \\ &\, \vdots + \\ &\, p14 \times g13 + \\ &\, g14 \end{aligned} \quad (24)$$

CIA 205

CIA 205 generates carry signal c15 from the $16^{th}$ digit to the $17^{th}$ digit in the conventional mode on the basis of carry signal c14 from the $15^{th}$ digit to the $16^{th}$ digit, generated in CLA 204, as well as carry propagation signal p15 and carry generating signal g15 of the $16^{th}$ digit. The circuit containing said CIA 205 and operation unit (100_15), an example of which is shown in FIG. 2, forms an embodiment of the second carry signal generator in the first invention.

Using the following equation, carry signal c15 can be computed from carry signal c14, carry propagation signal p15 and carry generating signal g15:

[Mathematical Equation 18]

$$c15 = c14 \times p15 + g15 \quad (25)$$

Exclusive-NOR Circuit 206

Exclusive-NOR circuit 206 computes the exclusive-NOR of carry signal c14 output from CLA 204 and carry signal c15 output from CIA 205. The operation result of exclusive-NOR circuit 206 becomes overflow detection signal OVF16 according the relationship shown in equation 1. This exclusive-NOR circuit 206 is an embodiment of the logic operation circuit of the first invention.

Carry Signal Output Circuit 207

Carry signal output circuit 207 outputs carry signal Cdual fed from the outside in the dual mode, or carry signal c15 from the less significant digit in the conventional mode, as carry signal c15A to the $17^{th}$ digit.

When mode assigning signal Mdual is "1," the mode is the dual mode, and when said signal is "0," it is the conventional mode. In this case, carry signal c15A is represented by the following equation.

[Mathematical Equation 19]

$$c15A = \overline{Mdual} \times c15 + Mdual \times Cdual \quad (26)$$

After equation 25 is substituted into equation 26 and regrouped, carry signal c15A becomes represented by the following equation:

[Mathematical equation 20]

$$c15A = \overline{Mdual} \times (c14 \times p15 + g15) + Mdual \times Cdual \quad (27)$$
$$= \overline{Mdual} \times p15 \times c14 + (\overline{Mdual} \times g15 + Mdual \times Cdual)$$

According to the relationship of said equation, it can be seen that carry signal c15A can also be generated using carry signal c14, carry propagation signal p15 and carry generating signal g15 instead of carry signal c15.

Figure 7:
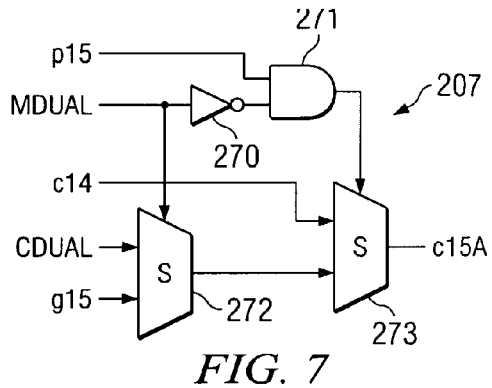
FIG. 7 is a block diagram illustrating an example of the constitution of the carry signal output circuit.

FIG. 7 is a block diagram illustrating an example of the constitution of carry signal output circuit 207.

The carry signal output circuit 207 shown as an example in FIG. 7 comprises NOT circuit 270, AND circuit 271, and selectors 272, 273. Selector 272 is an embodiment of the first selection circuit in the first invention. The circuit containing NOT circuit 270, AND circuit 271 and selector 273 is an embodiment of the second selection circuit of the first invention. Selector 272 selects carry signal Cdual in the dual mode, and it selects carry generating signal g15 in the conventional mode. That is, it selects carry signal Cdual when mode assigning signal Mdual is "1," and it selects carry generating signal g15 when mode assigning signal Mdual is "0." NOT circuit 270 outputs NOT of mode assigning signal Mdual. AND circuit 271 computes AND of the output signal of NOT circuit 270 and carry propagation signal p15, and outputs the operation result as the control signal for selector 273. Selector 273 selects the signal selected by selector 272 when the output signal of AND circuit 271 is "0," and it selects carry signal c14 when the output signal of AND circuit 271 is "1."

The operation of carry signal output circuit 207 shown in FIG. 7 is as follows. When the mode is the dual mode, that is, when mode assigning signal Mdual is "1," the output signal of AND circuit 271 becomes "0." Consequently, selector 272 selects carry signal Cdual, and selector 273 selects the output signal of selector 272. As a result, in this case, carry signal Cdual is output as carry signal c15A. In the conventional mode, that is, when mode assigning signal Mdual is "0," carry generating signal g15 is normally selected by selector 272. Also, the output signal of AND circuit 271 becomes equal to carry propagation signal p15. Consequently, if in this case carry propagation signal p15 is "1," carry signal c14 is output and, when carry propagation signal p15 is "0," carry generating signal g15 is output as carry signal c15A. On the other hand, as can be seen from equation 25, when carry propagation signal p15 is "1," because carry generating signal g15 is "0," carry signal c15 is equal to carry signal c14, and, when carry propagation signal p15 is "0," it is equal to carry generating signal g15. Consequently, in the conventional mode, carry signal c15 is output as carry signal c15A.

CLA 208

CLA 208 generates carry signal c30 from the $31^{st}$ digit to the $32^{nd}$ digit on the basis of carry propagation signals p16-p30 and carry generating signals g16-g30 for the portion from the $17^{th}$ digit to the $31^{st}$ digit, and carry signal cl5A input to the $17^{th}$ digit. For example, CLA 208 may be realized with the same constitution as that of CLA 204 shown in FIG. 6. That is, it is possible to obtain carry signal c30 by inputting the signals of the $17^{th}$-$31^{st}$ digit (p16-p30, g16-g30) and carry signal c15A instead of the signals of the $1^{st}$-$15^{th}$ digit (p0-p14, g0-g14) and carry signal CIN to the same circuit as that shown in FIG. 6.

Overflow Detection Signal Output Signal 209

In the case of the 40-bit mode, overflow detection signal output circuit 209 indicates the presence/absence of overflow in the addition operation with the $40^{th}$ digit taken as the sign digit and, in the case of the 32-bit mode, it indicates the presence/absence of overflow in the addition operation with the $32^{nd}$ digit taken as the sign digit, and it outputs overflow detection signal OVF. In the case of the 40-bit mode, overflow detection signal output circuit 209 outputs overflow detection signal OVF40, represented by equation 14, as overflow detection signal OVF. In this case, overflow detection signal output circuit 209 selects and outputs one of the overflow prediction signals SC0 and SC1 output from CSA 203 according to the value of carry signal c30. On the other hand, in the case of the 32-bit mode, overflow detection signal output circuit 209 outputs overflow detection signal OVF32 represented by equation 15 as overflow detection signal OVF.

When the addition result s31 of the $32^{nd}$ digit in equation 15 is replaced by the exclusive-OR of carry signal c30 and carry propagation signal p31, equation 15 is modified to become the following equation:

[Mathematical equation 21] (28)

$$OVF32 = (p31 \oplus c30) \times (s32 \times \ldots s39) +$$
$$\overline{(p31 \oplus c30) \times (s32 + \ldots + s39)}$$
$$= c30 \times (\overline{p31} \times ALL1 + p31 \times ALL0) +$$
$$\overline{c30} \times (p31 \times ALL1 - \overline{p31} \times ALL0)$$

In this equation, variables ALL1 and ALL0 are represented by the following equations:

[Mathematical Equation 22]

$$ALL1 = s32 \times \ldots \times s39 \quad (29)$$

$$ALL0 = \overline{s32 + \ldots + s39} \quad (30)$$

As can be seen from equation 29, when all of the addition results s32-s39 are "1," variable ALL1 becomes "0." Even when variable ALL1 is "1," if addition result s31 is not "1," all of the items containing variable ALL1 in equation 28 become "0." That is, even when addition result sj (where j represents an integer in the range of 32-39) is "1," if addition result s(j−1) of the digit preceding it is not "1," the result of equation 28 becomes the same as that when variable ALL1 is "0."

Here, assume that addition result sj is "p1_sj" when the addition result s(j−1) of the preceding digit is "1," this addition result p1_sj is represented by the following equation:

[Mathematical equation 23] (31)

$$p1\_sj = (aj \oplus bj) \oplus \{a(j-1) \times b(j-1)\}$$
$$= pj \oplus g(j-1)$$

If the variable obtained by replacing addition results s32-s39 in equation 29 with addition results p1_s32-p1_s39 is "pALL1," even when variable ALL1 in equation 28 is replaced by variable pALL1, represented by the following equation, there is still no change in the result of equation 28:

[Mathematical Equation 24]

$$pALL1 = p1\_s32 \times \ldots \times p1\_s39 \quad (32)$$

Also, as can be seen from equation 30, if addition results s32-s39 are not all "0," variable ALL0 becomes "0." Even if variable ALL0 is "1," if addition result s31 is not "0," all of the items containing variable ALL0 in equation 28 become "0." That is, even if addition result sj (where j represents an integer in the range of 32-39) is "0," if addition result s(j−1) of the preceding digit is not "0," the result of equation 28 becomes the same as that when variable ALL0 is "0."

Here, assuming addition result sj is "p0_sj" when addition result s(j−1) of the preceding digit is "0," its addition result p0_sj becomes represented by the following equation:

[Mathematical equation 25] (33)

$$p0\_sj = (aj \oplus bj) \oplus \{a(j-1) + b(j-1)\}$$
$$= pj \oplus \{a(j-1) + b(j-1)\}$$

If the variable obtained by replacing addition results s32-s39 in equation 30 with addition results p0_s32-p0_s39 is "pALL0," even when variable ALL0 in equation 28 is replaced by variable pALL0 represented by the following equation, there is still no change in the result of equation 28:

[Mathematical Equation 26]

$$pALL0 = \overline{p0\_s32 + \ldots + p0\_s39} \quad (34)$$

Consequently, overflow detection signal OFV32 shown in equation 28 can be represented by the following equation:

[Mathematical Equation 27]

$$OVF32 = c30 \times (\overline{p31} \times pALL1 + p31 \times pALL0) + \overline{c30} \times (p31 \times pALL1 + \overline{p31} \times pALL0) \quad (35)$$

The relationship of equation 35 enables the following constitution: overflow detection signal output circuit 209 executes computation for the portion within the parentheses of the first and second terms in equation 35 without waiting for the arrival of carry signal c30, and one of the computed results is selected by switching and output according to carry signal c30.

Figure 8:
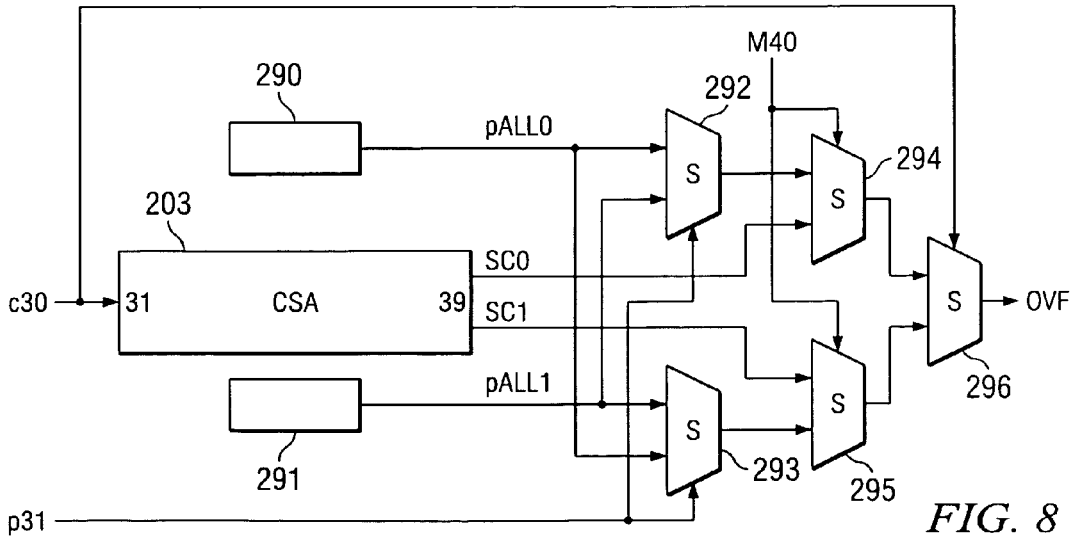
FIG. 8 is a block diagram illustrating an example of the constitution of the overflow detection signal output circuit.

FIG. 8 is a block diagram illustrating an example of the constitution of overflow detection signal output circuit 209, and CSA 203 related to it is also shown in the same FIG. Overflow detection signal output circuit 209 shown as an example in FIG. 8 has first bit value judging circuit 290, second bit value judging circuit 291 and selectors 292, . . . 296. First bit value judging circuit 290 is an embodiment of the first bit value judging circuit in the second invention. Second bit value judging circuit 291 is an embodiment of the second bit value judging circuit in the second invention. Selector 292 is an embodiment of the first selection circuit in the second invention. Selector 293 is an embodiment of the second selection circuit in the second invention. Selector 296 is an embodiment of the third selection circuit in the second invention. Selector 294 is an embodiment of the fourth selection circuit in the second and third inventions. Selector 295 is an embodiment of the fifth selection circuit in the second and third inventions.

CSA 203 is an embodiment of the overflow prediction circuit in the second and third inventions. When it is assumed that bit signal s31 of the 32$^{nd}$ digit in the result of addition of the portion from the prescribed less significant digit (1$^{st}$ digit in the conventional mode, 17$^{th}$ digit in the dual mode) to the 40$^{th}$ digit is "0," first bit value judging circuit 290 judges whether all the bit signals s32-s39 of the portion from the 33$^{rd}$ digit to the 40$^{th}$ digit in the addition result are "0." Then, "1" is output as the signal indicating the judgment result when all of bit signals s32-s39 are "0," and "0" is output when not all of said signals are "0." That is, first bit value judging circuit 290 outputs the computed result for variable pALL0 shown in equation 34 as said judgment signal.

Figure 9:
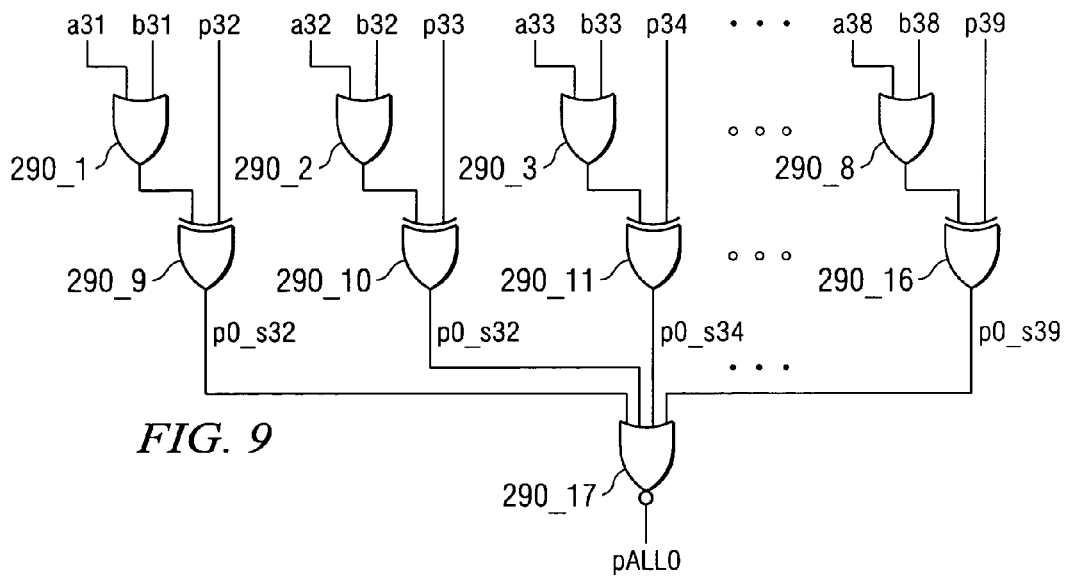
FIG. 9 is a block diagram illustrating an example of the constitution of the first bit value judging circuit.

FIG. 9 is a block diagram illustrating an example of the constitution of first bit value judging circuit 290. For example, as shown in FIG. 9, first bit value judging circuit 290 comprises OR circuits (290_1), . . . (290_8), exclusive-OR circuits (290_9), . . . . (290_16), and NOR circuit (290_17). The circuit containing OR circuits (290_1), . . . (290_8) and exclusive-OR circuits (290_9), . . . (290_16) is an embodiment of the first bit value judging circuit in the second invention. NOR circuit (290_17) is an embodiment of the first judgment circuit in the second invention. OR circuit (290j) (where j represents an integer in the range of 1-8) outputs OR of input bit signals a(j+30) and b(j+30). Exclusive-OR circuit 291_(j+8) outputs exclusive-OR of the output signal of OR circuit (290j) and carry propagation signal p(j+31). This output signal is equal to addition result p0_s(j+31) in the case when it is assumed that addition result s(j+30) is "0."

NOR circuit (290_17) computes NOR of the output signals of exclusive-OR circuits (290_9)-(290_16), and outputs it as the computation result for variable pALL0.

When it is assumed that bit signal s31 of the 32$^{nd}$ digit in the result of addition of the portion from the prescribed less significant digit (1$^{st}$ digit in the conventional mode, 17$^{th}$ digit in the dual mode) to the 40$^{th}$ digit is "1," second bit value judging circuit 291 judges whether all the bit signals s32-s39 of the portion from the 33$^{rd}$ digit to the 40$^{th}$ digit in the addition result are "1." Then, "1" is output as the signal indicating the judgment result when all of bit signals s32-s39 are "1," and "0" is output when not all of said signals are "1." That is, first bit value judging circuit 291 outputs the computed result for variable pALL1 shown in equation 32 as said judgment signal.

Figure 10:
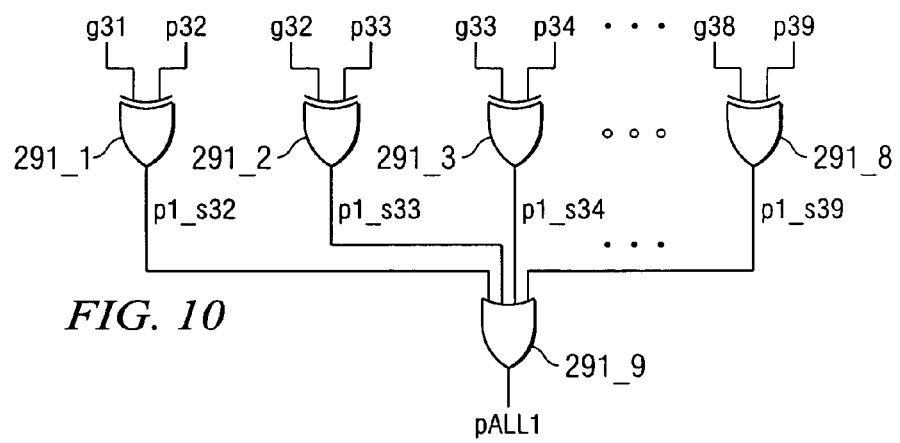
FIG. 10 is a block diagram illustrating an example of the constitution of the second bit value judging circuit.
Figure 13:
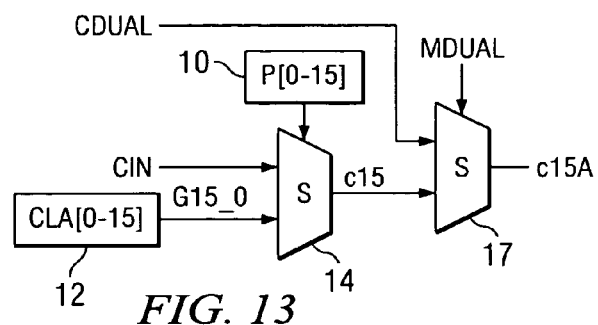
FIG. 13 is a block diagram illustrating an example of the constitution of the circuit for output of the carry signal to the 17$^{th}$ digit in the adder of the prior art.

FIG. 10 is a block diagram illustrating an example of the constitution of second bit value judging circuit 291. For example, as shown in FIG. 10, second bit value judging circuit 291 comprises exclusive-OR circuits (291_1), . . . (291_8), and AND circuit (291_9). The circuit containing exclusive-OR circuits (291_1), . . . (291_8) is an embodiment of the second bit value judging circuit in the second invention. AND circuit (291_9) is an embodiment of the second judgment circuit in the second invention. Exclusive-OR circuit (291_j) (where j represents an integer in the range of 1-8) outputs exclusive-OR of carry generating signal g(j+30) and carry propagation signal p(j+31). This operation result is equal to addition result p1s(j+31) when it is assumed that addition result s(j+30) is "1." AND circuit (291_9) computes AND of the output signals of exclusive-OR circuits (291_1)-(291_8), and outputs it as the computed result for variable pALL1. Selector 292 selects either the judgment signal of first bit value judging circuit 290 or the judgment signal of second bit value judging circuit 291 on the basis of carry propagation signal p31 of the $32^{nd}$ digit. That is, when carry propagation signal p31 of the $32^{nd}$ digit is "1," it selects the judgment signal (pALL1) of second bit value judging circuit 291, and when carry propagation signal p31 is "0," it selects the judgment signal (pALL0) of first bit value judging circuit 290. Selector 293 selects the judgment signal of first bit value judging circuit 290 or the judgment signal of second bit value judging circuit 291 not selected by selector 292 on the basis of carry propagation signal p31. That is, when carry propagation signal p31 is "1," it selects the judgment signal (pALL0) of first bit value judging circuit 290, and when carry propagation signal p31 is "0," it selects the judgment signal (pALL1) of second bit value judging circuit 291. Selector 294 selects the output signal of selector 292 or overflow prediction signal SC0 of CSA 203 on the basis of mode assigning signal M40. That is, in the 32-bit mode when mode assigning signal M40 is "0," it selects the output signal of selector 292, and in the 40-bit mode when mode assigning signal M40 is "1," it selects overflow prediction signal SC0 of CSA 203. Selector 295 selects the output signal of selector 293 or overflow detection signal SC1 of CSA 203 on the basis of mode assigning signal M40. That is, in the 32-bit mode, when mode assigning signal M40 is "0," it selects the output signal of selector 293, and in the 40-bit mode, when mode assigning signal M40 is "1," it selects overflow detection signal SC1 of CSA 203. Selector 296 selects the output signal of selector 294 or the output signal of selector 295 on the basis of carry signal c30, and outputs the selection result as overflow detection signal OVF. That is, when carry signal c30 is "0," it selects the output signal of selector 294, and when carry signal c30 is "1," it selects the output signal of selector 295.

The operation of overflow detection signal output circuit 209 shown in FIG. 8 is as follows. In the 40-bit mode when mode assigning signal M40 is "1," overflow prediction signals SC0 and SC1 generated in CSA 203 are selected by selectors 294 and 295, respectively, and they are input to selector 296. Upon the arrival of carry signal c30 to selector 296, one of the overflow prediction signals SC0 and SC1 is selected by selector 296 according to the value of said carry signal c30 and this is output as overflow detection signal OVF. In the 32-bit mode, when mode assigning signal M40 is "0," while the output signal of selector 292 is input to selector 296 through selector 294, the output signal of selector 293 is input through selector 295. Also, according to the value of carry propagation signal p31, the judgment signal (PALL0) of first bit value judging circuit 290 is output from one of selectors 292 and 293, and the judgment signal (pALL1) of second bit value judging circuit 291 is output from the other selector. That is, when carry propagation signal p31 is "1," judgment signal (pALL1) of second bit value judging circuit 291 is output from selector 292, and judgment signal (PALL0) of first bit value judging circuit 290 is output from selector 293. When carry propagation signal p31 is "0," the aforementioned outputs from selectors 292 and 293 are respectively reversed. When carry signal c30 arrives at selector 296, the output signal of selector 292 or 293 is selected by selector 296 according to the value of carry signal c30, and it is output as overflow detection signal OVF. That is, when carry signal c30 is "0," the output signal of selector 292 is selected, and when carry signal c30 is "1," the output signal of selector 293 is selected. Consequently, when carry signal c30 is "0" and carry propagation signal p31 is "0," or when carry signal c30 is "1" and carry propagation signal p31 is "1," the judgment signal (PALL0) of first bit value judging circuit 290 is output as overflow detection signal OVF. When carry signal c30 is "0" and carry propagation signal p31 is "1," or when carry signal c30 is "1" and carry propagation signal p31 is "0," the judgment signal (pALL1) of second bit value judging circuit 291 is output as overflow detection signal OVF. That is, an overflow detection signal OVF is output that satisfies the relationship of equation 35.

In the following, the operation of an adder with the aforementioned constitution will be explained. When an addition operation is performed, a prescribed value is set for control signal Scont, and carry generating signals (g0-g39) and carry propagation signals (p0-p39) are output from logic operation part 100. When said signals (g0-g39, p0-p39) are output from logic operation part 100, generation of carry signal c14 is executed in CLA 204, and parallel to this, computation of addition results s0-s14 of the $1^{st}$-$15^{th}$ digit is executed in CIA 201. Also, when carry signal c30 is "0" and "1," computation of addition results (s31_0-s39_0, s31_1-s39_1) of the $32^{nd}$-$40^{th}$ digit and generation of overflow prediction signals (SC0, SC1) are executed in CSA 203. In carry signal output circuit 207, selection of the signals is executed by selectors 272 and 273. In overflow detection signal output circuit 209, generation of the judgment signal in first bit value judging circuit 290 and second bit value judging circuit 291, and selection of the signals by selectors 292-295, are executed without waiting for the arrival of carry signal c30. In the conventional mode, when carry signal c14 output from CLA 204 is established, said carry signal c14 arrives at selector 273 of carry signal output circuit 207, and carry signal c15A to the $17^{th}$ digit is determined. Then, when said established carry signal c15A is input to CIA 202 and CLA 208, computation in CIA 202 of addition results s0-s14 of the $17^{th}$-$31^{st}$ digit and generation in CLA 208 of carry signal c30 are executed parallel to each other. Also, when carry signal c14 is established, computation of addition result s15 of the $16^{th}$ digit is executed in CIA 205. On the other hand, in the dual mode, carry signal c15A to the $17^{th}$ digit is established as carry signal Cdual irrespective of carry signal c14 output from CLA 204. Consequently, computation in CIA 202 of addition results s16-s30 of the $17^{th}$-$31^{st}$ digit and generation in CLA 208 of carry signal c30 are executed almost parallel to the processing for the $1^{st}$-$14^{th}$ digit. Computation in CIA 205 of addition result s15 of the $16^{th}$ digit is executed after establishment of carry signal c14, just as in the conventional mode.

Also, in CIA 205, generation of carry signal c15 is executed together with computation of addition result s15 and when said carry signal c15 is established, an exclusive-NOR operation is executed for carry signals c14 and c15 in exclusive-NOR circuit 206, and overflow detection signal OVF16 on the less significant side in the dual mode is generated. When carry signal c30 output from CLA 208 is established, one of the two sets of the results computed beforehand by CSA 203 is selected according to the signal value, and is output as addition results s31-s39. Also, one of the two signals input to selector 296 of overflow detection signal output circuit 209 is output as overflow detection signal OVF according to the value of established carry signal c30. Because these two signals are generated without waiting for the arrival of carry signal c30, overflow detection signal OVF can be established quickly once carry signal c30 arrives at selector 296.

Figure 12:
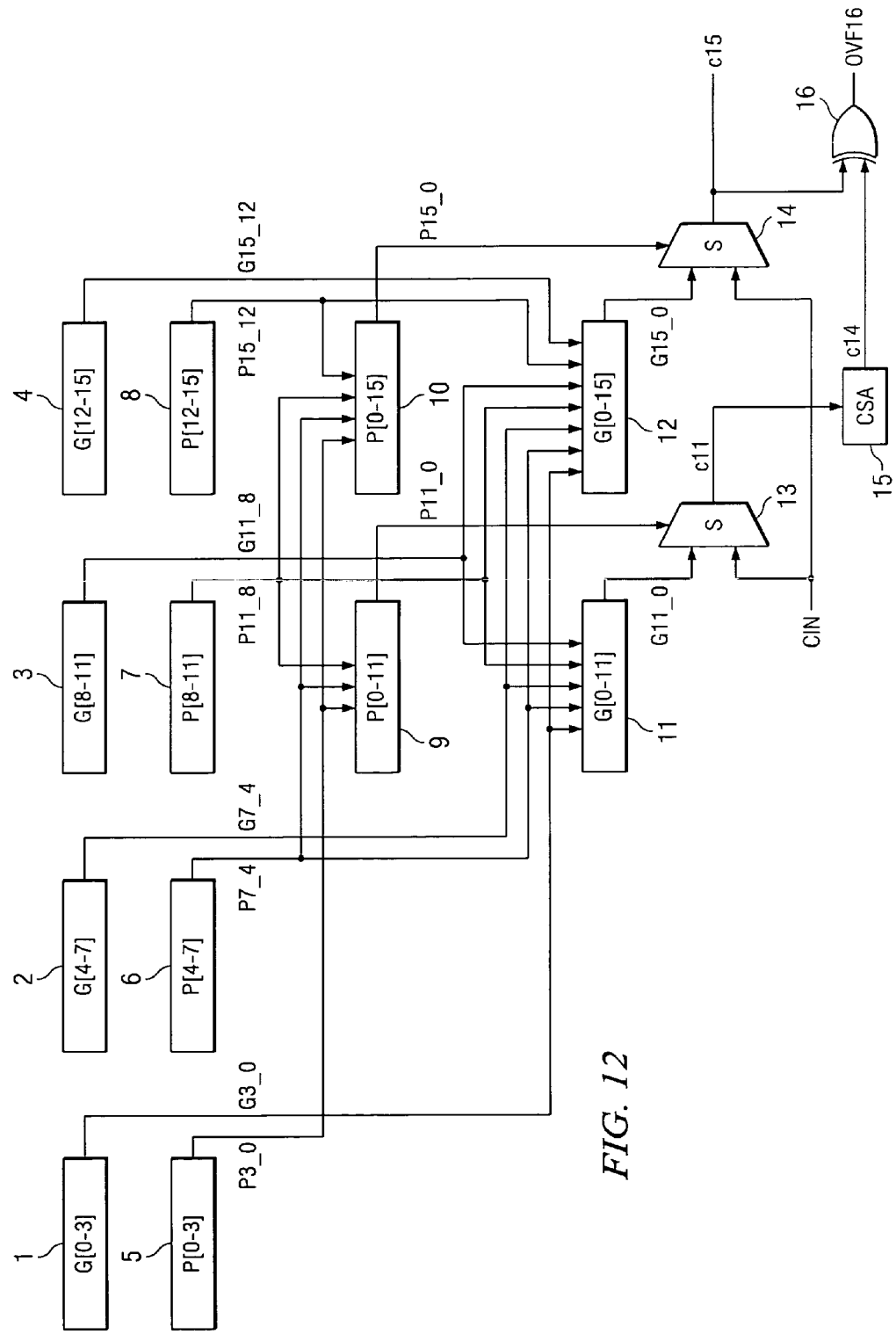
FIG. 12 is a block diagram illustrating an example of the constitution of the circuit for generating overflow detection signals of the less significant 16 bits in the adder of the prior art.

As explained above, for the adder of this embodiment, carry signal c14 from the $15^{th}$ digit to the $16^{th}$ digit in the result of addition from the $1^{st}$ digit to the $16^{th}$ digit of the input data is generated and output from CLA 204 on the basis of the bit signals (a0-a15, b0-b15) for the portion from the $1^{st}$ digit to the $15^{th}$ digit of the input data and of carry signal CIN input to the $1^{st}$ digit. Then, on the basis of said generated carry signal c14 and bit signals (a15, b15) of the $16^{th}$ digit of the input data, carry signal c15 from the $16^{th}$ digit to the $17^{th}$ digit is generated and output from CIA 205. Overflow detection signal OVF 16 is generated by processing said carry signals c14 and c15 in exclusive-NOR circuit 206. Consequently, compared to the prior art in which carry signals c11 and c15 are generated in parallel as shown in FIG. 12, the circuit scale of the carry look-ahead circuit becomes smaller in the present invention, and the number of driving elements is reduced. Consequently, the power consumption can be reduced. Also, compared to the carry look-ahead circuit shown in FIG. 12, it becomes possible to reduce the number of circuits in the second stage as the capacitive load for the carry generating signal output circuit and carry propagation signal output circuit of the first stage. Consequently, it is possible to generate overflow detection signal OVF16.

For the adder of this embodiment, carry signal Cdual is selected by selector 272 in the dual mode when addition is executed from the $17^{th}$ digit to a prescribed more significant digit (the $32^{nd}$ digit in the 32-bit mode, the $40^{th}$ digit in the 40-bit mode), and carry generating signal g15 of the $16^{th}$ digit is selected in the conventional mode when addition is executed from the $1^{st}$ digit to said prescribed more significant digit. The output signal of selector 272 is selected by selector 273 in the dual mode, and carry signal c14 or the output signal of selector 272 is selected in the conventional mode, according to carry propagation signal p15 of the $16^{th}$ digit. The selection result from said selector 273 is then output as carry signal c15A for said $17^{th}$ digit to CLA 208 and CIA 202. Consequently, carry signal c15A can be generated at a higher speed than in the circuit shown in FIG. 13 when not only critical signal (c14), required to have the highest speed among the signals that generate carry signal c15A, must pass through selector 273 of the first stage before reaching the output, but also the same signal (G15_0) must pass through selectors (14, 17) of the second stage.

In addition, for the adder of this embodiment, assuming that the bit signal of the $32^{nd}$ digit of the result of addition from the prescribed less significant digit (the $1^{st}$ digit in the conventional mode, the $17^{th}$ digit in the dual mode) to the $40^{th}$ digit of the input data has value "0," first bit value judging circuit 290 judges whether bit signals s32-s39 of the portion from the $33^{rd}$ digit to the $40^{th}$ digit of the addition result are all "0." Assuming the bit signal of the $32^{nd}$ digit in said addition result has value "1," said second bit value judging circuit 291 judges whether bit signals s32-s39 of the portion from the $33^{rd}$ digit to the $40^{th}$ digit in said addition result are all "1." Based on carry propagation signal p31 of the $32^{nd}$ digit, selector 292 selects either judgment signal (pALL0) of first bit value judging circuit 290 or judgment signal (pALL1) of second bit value judging circuit 291. Based on carry propagation signal p31, selector 293 selects from judgment signal (pALL0) of first bit value judging circuit 290 and judgment signal (pALL1) of second bit value judging circuit 291 that judgment signal not selected by selector 292. Then, in the 32-bit mode, selector 296 selects the judgment signal selected by selector 292 or that selected by selector 293 on the basis of carry signal c30 from the $31^{st}$ digit to the $32^{nd}$ digit, and outputs the selected result as overflow detection signal OVF in the 32-bit mode. Consequently, it is possible to generate the input signal for selector 296 of the last stage without waiting for the establishment of carry signal c30 as the most delayed signal, and when carry signal c30 is established, it is possible to establish overflow detection signal OVF by controlling only selector 296. Consequently, overflow detection signal OVF can have a much higher speed in the 32-bit mode compared to the circuit shown in FIG. 14, which requires passage of several circuits after establishment of the value of carry signal c30.

In this embodiment, in the first case when carry signal c30 is "0" and in the second case when carry signal c30 is "1," CSA 203 predicts whether overflow occurs in the 40-bit mode, and generates respective prediction signals SC0 and SC1. Based on mode assigning signal M40, selector 294 selects the judgment signal output from selector 292 or prediction signal SC0 of said first case. Based on mode assigning signal M40, selector 295 selects the judgment signal output from selector 293 or prediction signal SC1 of said second case. Based on carry signal c30, selector 296 selects the signal selected by selector 294 or that selected by selector 295. Consequently, in both the 32-bit mode and the 40-bit mode, it is possible to generate the signals up to the input signal for selector 296 of the last stage without waiting for establishment of carry signal c30, and it is possible to detect overflow in the two modes at high speed.

Embodiment 2

Figure 11:
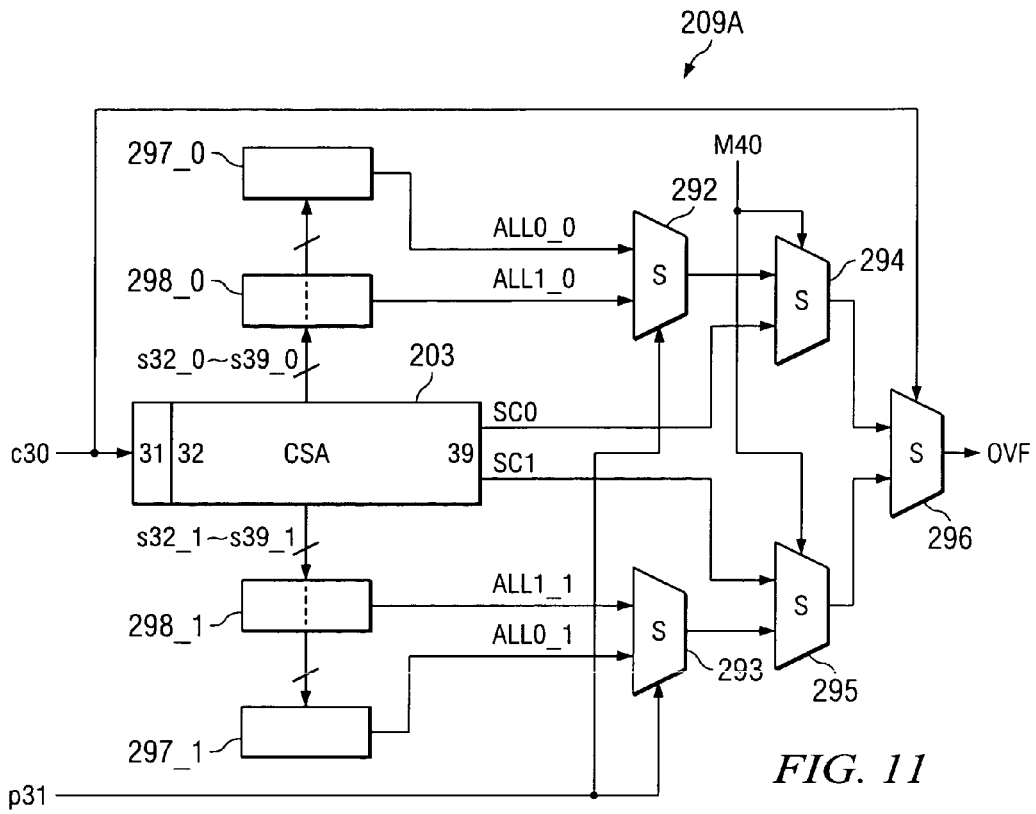
FIG. 11 is a block diagram illustrating an example of the constitution of the overflow detection signal output circuit of Embodiment 2.
Figure 14:
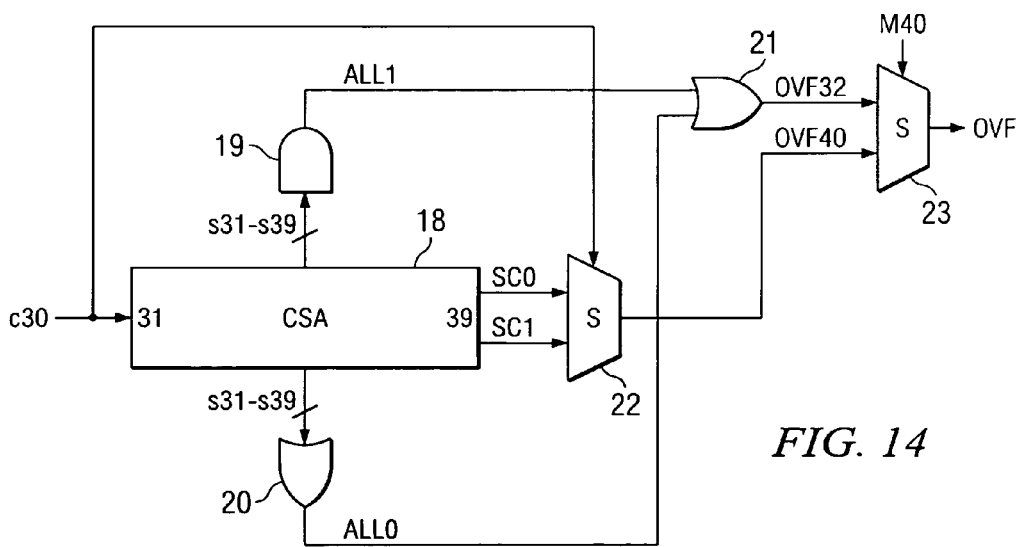
FIG. 14 is a block diagram illustrating an example of the circuit that generates the overflow detection signal of the more significant side in the adder of the prior art.

In the following, Embodiment 2 of the present invention will be explained. FIG. 11 is a block diagram illustrating an example of the constitution of overflow detection signal output circuit (209A) pertaining to Embodiment 2.

The adder of this embodiment has the same constitution as that of the adder in Embodiment 1, except that overflow detection signal output circuit 209 shown in FIG. 8 is replaced by overflow detection signal output circuit (209A) shown in FIG. 11. Overflow detection signal output circuit (209A) shown in FIG. 11 has selectors 292-296 just like those in overflow detection signal output circuit 209, and at the same time it has first judgment circuit (297_0), second judgment circuit (298_0), third judgment circuit (297_1) and fourth judgment circuit (298_1) in place of first bit value judging circuit 290 and second bit value judging circuit 291. Also, first judgment circuit (297_0) is an embodiment of the first judgment circuit of the third invention. Second judgment circuit (298_0) is an embodiment of the second judgment circuit of the third invention. Third judgment circuit (297_1) is an embodiment of the third judgment circuit of the third invention. Fourth judgment circuit (298_1) is an embodiment of the fourth judgment circuit of the third invention. Also, CSA 203 is an embodiment of the first addition result predicting circuit and the second addition result predicting circuit of the third invention. First judgment circuit (297_0) has input to it sum values s32_0-s39_0, computed beforehand by CSA 203, with carry signal c30 assumed to be "0," and when they are all "0," it outputs "1," and when they are not all "0," it outputs "0" as judgment signal ALL0_0.

When predicted sum values s32_0-s39_0 are all "1," second judgment circuit (298_0) outputs "1," and when they are not all "1," it outputs "0" as the judgment signal ALL1_0. Third judgment circuit (297_1) has input to it sum values s32_1-s39_1 computed beforehand by CSA 203, with carry signal c30 assumed to be "1," and when they are all "0," it outputs "1," and when they are not all "0," it outputs "0" as judgment signal ALL0_1.

When predicted sum values s32_1-s39_1 are all "1," fourth judgment circuit (298_1) outputs "1," and when they are not all "1," it outputs "0" as the judgment signal ALL1_1. In place of judgment signal (PALL0) of first bit value judging circuit 290, judgment signal ALL0_0 of first judgment circuit (297_0) is input to selector 292, and in place of judgment signal (pALL1) of second bit value judging circuit 291, judgment signal ALL1_0 of second judgment circuit 298_0 is input. In place of judgment signal (PALL0) of first bit value judging circuit 290, judgment signal ALL0_1 of third judgment circuit (297_1) is input to selector 293, and in place of judgment signal (pALL1) of second bit value judging circuit 291, judgment signal ALL1_1 of fourth judgment circuit 298_1 is input. With regard to the input signals of selectors 292-296 as well as their switch operations, these are the same as those of overflow detection signal output circuit 209 shown in FIG. 8.

By means of overflow detection signal output circuit (209A) with the aforementioned constitution, the variables ALL0 and ALL1 substituted into the first term of equation 28 are replaced by said judgment signals ALL0_1 and ALL1_1, and, at the same time, variables ALL0 and ALL1 in the second term of equation 28 are replaced by said judgment signals ALL0_0 and ALL1_0, and the computed signal is obtained as the overflow detection signal of the 32-bit mode.

Because in the first term of equation 28 carry signal c30 becomes "0" if it is not "1," even when judgment signals ALL0_1 and ALL1_1 obtained by assuming carry signal c30 to be "1" are replaced by variables ALL0 and ALL1, there is still no change in the value of equation 28. Also, because in the second term of equation 28 carry signal c30 becomes "0" if it is not "1," even when judgment signals ALL0_0 and ALL1_0 obtained by assuming carry signal c30 to be "0" are substituted for variables ALL0 and ALL1, there is still no change in the value of equation 28. Consequently, as shown in FIG. 11, it is possible to obtain the overflow detection signal of the 32-bit mode even with the method using the predicted value of CSA 203. Moreover, overflow detection signal output circuit 209A shown in FIG. 11 also enables generating the signals up to the input signal for selector 296 of the last stage without waiting for establishment of carry signal c30, and it is possible to detect overflow in the 32-bit mode at high speed.

The present invention is not limited to these embodiments. Various modifications can be made. For example, the data length of the various signals and the constitution of the logic circuits in said embodiments are merely examples, and it is possible to change them at will. Also, the constitution of the adder that computes the addition result and the constitution of the carry look-ahead circuit are only examples, and various other constitutions may be adopted.

The invention claimed is:

1. An adder having an overflow output indicating when a sum of a first input number and a second input number overflows comprising:

a logic operation circuit receiving respective bits of said first input number and said second input number and generating a carry propagate signal and a carry generate signal for each i-th bit of said first input number and said second input number;

a first carry look ahead adder receiving a least significant bit carry input signal, carry propagate signals and carry generate signals for a first predetermined number of least significant bits, said first carry look ahead adder generating a carry output for a most significant of said first predetermined number of least significant bits;

a second carry look ahead adder receiving said carry output for said most significant of said first predetermined number of least significant bits, carry propagate signals and carry generate signals for a second predetermined number of more significant bits, said second carry look ahead adder generating a carry output for a most significant of said second predetermined number of more significant bits;

a first carry increment adder receiving said least significant bit carry input signal, carry propagate signals and carry generate signals for said first predetermined number of least significant bits, said first carry increment adder generating a sum output for each of said first predetermined number of least significant bits by propagating local carry signals;

a second carry increment adder receiving said carry output for a most significant of said first predetermined number of least significant bits, carry propagate signals and carry generate signals for said second predetermined number of more significant bits, said second carry increment adder generating a sum output for each of said second predetermined number of least significant bits by propagating local carry signals;

a carry select adder receiving said carry output for a most significant of said second predetermined number of more significant bits, carry propagate signals and carry generate signals for a third predetermined number of most significant bits, said carry save adder including:

a first chain of bit adders, each bit adder receiving a carry propagate signal and a carry generate signal of a corresponding bit from said logic operation circuit and a carry input, each bit adder generating a first preliminary sum output and a first preliminary carry output for said corresponding bit, a first bit adder in said first chain of bit adders receiving a 0 carry input and subsequent bit adders in said first chain of bit adders receiving a carry input from a prior bit adder in said first chain of bit adders, a second chain of bit adders, each bit adder receiving a carry propagate signal and a carry generate signal of a corresponding bit from said logic operation circuit and a carry input, each bit adder generating a second preliminary sum output and a second preliminary carry output for said corresponding bit, a first bit adder in said second chain of bit adders receiving a 1 carry input and subsequent bit adders in said second chain of bit adders receiving a carry input from a prior bit adder in said second chain of bit adders, a set of selectors having a first input receiving said first preliminary sum output of a corresponding bit, a second input receiving said second preliminary sum output, a selection input receiving said carry output for said most significant of said second predetermined number of more significant bits and an output, each selector outputting said first preliminary sum output or said second preliminary sum output dependent upon said carry output for said most significant of said second predetermined number of more significant bits, a first exclusive NOR gate having a first input receiving said carry output of a most significant bit adder in said first chain of bit adders, a second input receiving said carry output of a next most significant bit adder in said first chain of bit adders, and a second exclusive NOR gate having a first input receiving said carry output of a most significant bit adder in said second chain of bit adders, a second input receiving said carry output of a next most significant bit adder in said second chain of bit adders; and an overflow detection output circuit including a first bit value circuit including
  a plurality of OR gates, each OR gate having a first input receiving a corresponding bit of said first input number, a second input receiving a corresponding bit of said second input number and an output,
  a plurality of exclusive OR gates, each exclusive OR gate having a first input receiving said output of a corresponding OR gate, a second input receiving said carry propagate signal of a corresponding next bit and an output, and
  a NOR gate having plural inputs each receiving said output of a corresponding exclusive OR gate and an output,
a second bit value circuit including
  a plurality of exclusive OR gates, each exclusive OR gate having a first input receiving a carry generate signal of a corresponding, a second input receiving carry propagate signal of a corresponding next bit and an output, and
  an AND gate having plural inputs each receiving said output of a corresponding exclusive OR gate and an output,
a first selector having a first input receiving said output of said first bit value detect circuit, a second input receiving said output of said second bit value detect circuit, a control input receiving said carry propagate signal of a least significant bit of said carry select adder and an output, said first selector outputting said output of said first bit detect circuit or said output of said second bit detect circuit dependent upon said carry output for said most significant of said second predetermined number of more significant bits,
a second selector having a first input receiving said output of said second bit value detect circuit, a second input receiving said output of said first bit value detect circuit, a control input receiving said carry propagate signal of a least significant bit of said carry select adder and an output, said second selector outputting said output of said second bit detect circuit or said output of said first bit detect circuit dependent upon said carry output for said most significant of said second predetermined number of more significant bits,
a third selector having a first input receiving said output of said first selector, a second input receiving said output of said first exclusive NOR gate of said carry select adder, a control input receiving a bit width mode signal and an output, said third selector outputting said output of said first selector or said output of said first exclusive NOR gate of said carry select adder dependent upon said bit width mode signal, a fourth selector having a first input receiving said output of said second exclusive NOR gate of said carry select adder, a second input receiving said output of said second selector, a control input receiving a bit width mode signal and an output, said fourth selector outputting said output of said second exclusive NOT gate of said carry select adder or said output of said second selector dependent upon said bit width mode signal, and a fifth selector having a first input receiving said output of said third selector, a second input receiving said output fourth selector, a control input receiving said carry output of said carry output for a most significant of said second predetermined number of more significant bits, said fifth selector outputting said output of said third selector or said output fourth selector dependent upon said carry output for a most significant of said second predetermined number of more significant bits, said output being said overflow output.

2. The adder of claim 1, further comprising:
a lower order carry output circuit including:
  a first selector having a first input receiving a carry input to a least significant bit of a higher order bit section of said adder, a second input receiving said carry generate signal of a most significant bit of a lower order bit section of said adder and a control input receiving a mode signal,
  an inverter having an input receiving said mode signal and an output,
  an AND gate having a first input receiving a carry propagate signal of a most significant bit of said lower order bit section of said adder, a second input receiving said output of said inverter and an output, and
  a second selector having a first input receiving a carry output signal of a second most significant bit of said lower order bit section, a second input receiving said output of said first selector, a control input receiving said output of said AND gate and an output, said output generating said carry output for a most significant of said first predetermined number of least significant bits supplied to said second carry look ahead adder.

3. The adder of claim 2, further comprising:
an exclusive OR gate having a first input receiving a carry output of a most significant bit of said first predetermined number of least significant bits, a second receiving a carry output of a second most significant bit of said first predetermined number of least significant bits and an output, said output generating a lower order overflow signal.

* * * * *